United States Patent
Iyi et al.

(10) Patent No.: US 9,545,615 B2
(45) Date of Patent: Jan. 17, 2017

(54) WATER-SWELLING LAYERED DOUBLE HYDROXIDE, METHOD FOR PRODUCING SAME, GEL OR SOL SUBSTANCE, DOUBLE HYDROXIDE NANOSHEET, AND METHOD FOR PRODUCING SAME

(75) Inventors: Nobuo Iyi, Ibaraki (JP); Yasuo Ebina, Ibaraki (JP); Takayoshi Sasaki, Ibaraki (JP)

(73) Assignee: NATIONAL INSTITUTE FOR MATERIALS SCIENCE, Tsukuba-shi (JP)

( * ) Notice: Subject to any disclaimer, the term of this patent is extended or adjusted under 35 U.S.C. 154(b) by 741 days.

(21) Appl. No.: 13/982,191

(22) PCT Filed: Jan. 18, 2012

(86) PCT No.: PCT/JP2012/050973
§ 371 (c)(1),
(2), (4) Date: Jul. 26, 2013

(87) PCT Pub. No.: WO2012/102150
PCT Pub. Date: Aug. 2, 2012

(65) Prior Publication Data
US 2013/0313476 A1    Nov. 28, 2013

(30) Foreign Application Priority Data
Jan. 27, 2011 (JP) ................. 2011-014742

(51) Int. Cl.
*B01J 20/28* (2006.01)
*C01G 51/00* (2006.01)
(Continued)

(52) U.S. Cl.
CPC .......... *B01J 20/28014* (2013.01); *C01F 7/002* (2013.01); *C01F 7/005* (2013.01);
(Continued)

(58) Field of Classification Search
USPC .......................................... 252/194; 428/220
See application file for complete search history.

(56) References Cited

FOREIGN PATENT DOCUMENTS

| JP | 2004-352541 A | 12/2004 |
|----|---------------|---------|
| JP | 2005-089269 A | 4/2005 |

(Continued)

OTHER PUBLICATIONS

Roland-Swanson et al, Polymerization of Sulfopropyl Methacrylate, a Surface Active Monomer, within Layered Double Hydroxide, Chem. Mater. 2004, 16, 5512-5517 (Punl. on Web Nov. 11, 2004).*

(Continued)

*Primary Examiner* — Daniel S Metzmaier
(74) *Attorney, Agent, or Firm* — Westerman, Hattori, Daniels & Adrian, LLP

(57) ABSTRACT

Provided is a water-swelling layered double hydroxide characterized by having an organic sulfonic acid anion ($A^-$) between layers, and by being represented by the below mentioned general formula (1): $Q_zR(OH)_{2(z+1)}(A^-)_{(1-y)}(X^{n-})_{y/n} \cdot mH_2O$ ... (1). Here, Q is a divalent metal, R is a trivalent metal, $A^-$ is an organic sulfonic acid anion, m is a real number greater than 0, and z is in the range of $1.8 \leq z \leq 4.2$. $X^{n-}$ is the n-valent anion remaining without $A^-$ substitution, n is 1 or 2, y represents the remaining portion of $X^{n-}$, and $0 \leq y < 0.4$.

11 Claims, 29 Drawing Sheets

(51) Int. Cl.
- *C01G 53/00* (2006.01)
- *C01F 7/00* (2006.01)
- *C01G 5/00* (2006.01)
- *C09C 1/40* (2006.01)

(52) U.S. Cl.
CPC .......... *C01G 5/006* (2013.01); *C01G 51/006* (2013.01); *C01G 53/006* (2013.01); *C09C 1/40* (2013.01); *C01P 2002/08* (2013.01); *C01P 2002/22* (2013.01); *C01P 2002/72* (2013.01); *C01P 2002/82* (2013.01); *C01P 2002/84* (2013.01); *C01P 2004/03* (2013.01); *C01P 2004/04* (2013.01)

(56) References Cited

FOREIGN PATENT DOCUMENTS

| JP | 2005-335965 A | 12/2005 |
| JP | 2006-052114 A | 2/2006 |
| JP | 2007-031189 A | 2/2007 |
| JP | 2008-001806 A | 1/2008 |
| JP | 2008-184343 A | 8/2008 |
| JP | 4228077 B2 | 2/2009 |
| JP | 2009-173482 A | 8/2009 |
| WO | 2009/072488 A2 | 6/2009 |

OTHER PUBLICATIONS

Meyn et al, Anion-Exchange Reactions of Hydroxy Double Salts, Inorg. Chem. 1993, 32, 1209-1215.*

Li, Liang, et al., "Positively Charged Nanosheets Derived via Total Delamination of Layered Double Hydroxides", Chem. Mater., 2005, vol. 17, No. 17, pp. 4386-4391, cited in specification.

Cavani, F., et al., "Hydrotalcite-Type Anionic Clays: Preparation, Properties and Applications.", Catalysis Today, 1991, vol. 11, pp. 173-301, cited in specification.

Miyata, Shigeo, "Anion-Exchange Properties of Hydrotalcite-Like Compounds", Clays and Clay Minerals, 1983, vol. 31, No. 4, pp. 305-311, cited in specification.

Reichle, Walter T., "Synthesis of Anionic Clay Minerals (Mixed Metal Hydroxides, Hydrotalcite)", Solid Slates Ionics, 1986, vol. 22, pp. 135-141, cited in specification.

Hibino, Toshiyuki, "Delamination of Layered Double Hydroxides Containing Amino Acids", Chem. Mater., 2004, vol. 16, No. 25, pp. 5482-5488, cited in specification.

Liu, Zhaoping, et al., "General Synthesis and Delamination of Highly Crystalline Transition-Metal-Bearing Layered Double Hydroxides", Langmuir, 2007, vol. 23, No. 2, pp. 861-867, cited in specification.

Okamoto, Kentaro, et al., "Preparation of highly oriented organic-LDH hybrid films by combining the decarbonation, anion-exchange, and delamination processes", Journal of Materials Chemistry, 2006, vol. 16, pp. 1608-1616, cited in specification.

Hibino, Toshiyuki, et al., "Delamination of layered double hydroxides in water", Journal of Materials Chemistry, 2005, vol. 15, pp. 653-656, cited in specification.

Stanimirova., T. S., et al., "Mechanism of hydrotalcite regeneration", Journal of Materials Science Letters, 2001, vol. 20, pp. 453-455, cited in specification.

Iyi, Nobuo, et al., "Water-Swellable MgAl-LDH (Layered Double Hydroxide) Hybrids: Synthesis, Characterization, and Film Preparation", Langmuir, 2008, vol. 24, No. 10, pp. 5591-5598, cited in specification.

Iyi, Nobuo, et al., "Deintercalation of Carbonate Ions from a Hydrotalcite-Like Compound: Enhanced Decarbonation Using Acid-Salt Mixed Solution", Chem. Mater., 2004, vol. 16, No. 15, pp. 2926-2932, cited in specification.

Iyi, Nobuo, et al., "One-step Conversation of $CO3^{2-}$-LDH (Layered Double Hydroxide) into Anion-exchangeable LDHs Using an Acetate-buffer/Salt Method", Chem. Lett., 2010, vol. 39, pp. 591-593, cited in specification.

Iyi, Nobuo, "Factors influencing the hydration of layered double hydroxides (LDHs) and the appearance of an intermediate second staging phase", Applied Clay Science, 2007, vol. 35, pp. 218-227, cited in specification.

Anbarasan, R., et al., "Modification of layered double hydroxides by short chain organic surfactants via ionexchange method", Indian Journal of Chemical Technology, 2005, vol. 12, pp. 259-262, cited in ISR.

International Search Report of PCT/JP2012/050973, mailing date of Apr. 3, 2012.

* cited by examiner (a) CO$_3^{2-}$-LDH3  (b) ClO$_4^-$-LDH3  (c) Ise-LDH3

(a) CO₃²⁻-LDH2  (b) ClO₄⁻-LDH2  (c) Ise-LDH2

WATER-SWELLING LAYERED DOUBLE HYDROXIDE, METHOD FOR PRODUCING SAME, GEL OR SOL SUBSTANCE, DOUBLE HYDROXIDE NANOSHEET, AND METHOD FOR PRODUCING SAME

TECHNICAL FIELD

The present invention relates to a water-swelling layered double hydroxide that turns into gel in an aqueous solvent consisting primarily of water, a method for producing the same, gel or sol substance produced by using the water-swelling layered double hydroxide, double hydroxide nanosheet, and a method for producing the same.

BACKGROUND ART

Layered double hydroxide (LDH) is layered compounds having cationic double hydroxide layers and charge-balancing interlayer anions (negative ions), and are also referred to as hydrotalcite-like substances.

Generally, if clay minerals such as montmorillonite contact water or organic solvent, solvent molecules enter between layers, increasing interlayer distance and thus causing swelling and gelation. It is known that if swelling continues, each layer is separated and delaminated from each other, and eventually turns to nanosheets, and transparent colloidal solution, namely sol, is obtained.

It has recently been found that with layered inorganic compounds other than clay minerals such as titanic acid compounds also, by introducing specific organic ions between layers, the layers are delaminated from each other in water, turning into nanosheets, and studies have been conducted to form nano-multilayered structures by layer-by-layer self assembly process wherein a cationic sheet and an anionic sheet are deposited alternately.

Double hydroxide nanosheets obtained from LDH are attracting attention for the following three reasons:
(1) Many inorganic nanosheets exhibit anionic property, and there are only a few cationic nanosheets. LDH layers are cationic, and cationic nanosheets can be laminated alternately with anionic nanosheets (Non-patent Literature 1 and Patent Literature 1),
(2) Various magnetic or electrically conductive divalent and trivalent metal ions can be introduced into LDH layers, which increases the possibility of material design (Non-patent Literatures 2 to 4), and
(3) Synthesis of LDH itself is relatively easy.

Focusing on such advantages of LDH, attempts have been made to produce cationic nanosheets by allowing LDH to swell, causing delamination.

Recent finding that LDH could be delaminated by formamide ($HCONH_2$) has paved the way for producing LDH nanosheets (Non-patent Literatures 1, 5, 6, 7 and Patent Literatures 1, 2). However, since formamide hardly evaporates and is toxic to humans, and alternate lamination is performed not in an organic solvent such as formamide but in water in many cases, delamination and generation of nanosheets in water have been desired.

Delamination of LDH in water has been achieved by introducing carboxylate anions, which are organic anions, between layers. For example, it is reported that LDH delamination containing lactate anions ($CH_3$—$CH(OH)$—$COO^-$) between layers (Non-patent Literature 8 and Patent Literature 3) and LDH delamination containing magnesium acrylate salt and/or magnesium acetate salt between layers (Patent Literatures 4, 5). However, all of the above have adopted "the reconstruction process", where LDH structurally altered by heat treatment performed at temperatures close to as high as 600° C. are immersed in a salt solution containing these carboxylate anions to cause reaction to occur. Consequently, the crystallinity of the obtained LDH is low, crystalline form is instable, and crystal size is as small as approximately several nanometers. It was therefore difficult to obtain large high-quality LDH nanosheets. Furthermore, with the above reconstruction process, the composition of constituent metal ions may vary (Non-patent Literature 9). In addition, as described in the above Non-patent Literature 8, since nearly 50% of the interlayer anions are carbonate ions, reflection peak in X-ray diffraction is broad, and crystallinity is low. Furthermore, the Mg/Al molar ratio of the LDH to be used as a starting material is 3 in many cases, and there are only a small number of verification examples of LDH having Mg/Al molar ratio of 2, where the layer electric charge density is high and thus delamination is considered to be difficult, or LDH of metal ions other than Mg and Al LDH delamination using water has thus lacked versatility.

Inventors have succeeded in the synthesis of water-swelling LDH, which includes acetate anions between the layers by an anion exchange method to replace the anion in LDH interlayer. Above synthesis of water-swelling LDH has been filed as patent application (Patent Literature 6, Patent Literature 7 and Non-patent Literature 11). The obtained acetate anion-type LDH is superior to other water-swelling LDH from the viewpoints of purity and delamination property. However, if stored in open state in the air, it reacts with carbon dioxide in the air, and turns into a carbonate ion-type LDH by discharging acetate anions. It is therefore necessary to store it in a tightly-capped container, and its stability is not perfect (Patent Literature 6, Non-patent Literature 10). Odor resulting from discharge of acetic acid is another problem.

Attempts have been made to synthesize water-swelling LDH by introducing organic carboxylate anions between layers, and each of such attempts has found respectively distinguishing water-swelling LDH. However, as described above, high-quality water-swelling LDH satisfying all the conditions including high crystallinity, high purity, high stability, versatility, scentlessness, and non-toxicity have not been found yet.

CITATION LIST

Patent Literature

Patent Literature 1: JP 2007-31189 A
Patent Literature 2: JP 2005-89269 A
Patent Literature 3: JP 2006-52114 A
Patent Literature 4: JP 2008-184343 A
Patent Literature 5: JP 2008-1806 A
Patent Literature 6: JP 2009-173482 A
Patent Literature 7: JP 4228077 B
Patent Literature 8: WO 2009/072488
Patent Literature 9: JP 2005-335965 A

Non-Patent Literature

Non-patent Literature 1: Li, L., Ma, R., Ebina, Y., Iyi, N., Sasaki, T., Chem. Matter. 17, 4386-4391 (2005)
Non-patent Literature 2: Cavani, F., Trifiro, F., Vaccari, A., Catal. Today 11, 173-301 (1991)
Non-patent Literature 3: Miyata, S., Clays Clay Miner. 31, 305-311 (1983)

Non-patent Literature 4: Reichle, W. T., Solid States Ionics 22, 135-141 (1986)
Non-patent Literature 5: Hibino, T., Chem. Mater. 16, 5482-5488 (2004)
Non-patent Literature 6: Li, L., Ma, R., Ebina, Y., Iyi, N., Takata, K., Sasaki, T., Langmuir, 2007, 23, 861-867 (2007)
Non-patent Literature 7: Okamoto, K., Sasaki, T., Fujita, T., Iyi, N., J. Mater. Chem., 16, 1608-1616 (2006)
Non-patent Literature 8: Hibino, T., Kobayashi, M., J. Mater. Chem. 15, 653-656 (2005)
Non-patent Literature 9: Stanimirova, T. S., Kirov, G., Dinolova, E., J. Mater. Sci. Lett. 20, 453-455 (2001)
Non-patent Literature 10: Iyi, N., Ebina, Y., Sasaki, T., Langmuir, 24, 5591-5598 (2008)
Non-patent Literature 11: Iyi, N., Matsumoto, T., Kaneko, Y., Kitamura, K., Chem. Mater. 16, 2926-2932 (2004)
Non-patent Literature 12: Iyi, N., Yamada, H., Chem. Lett. 39, 591-593 (2010)
Non-patent Literature 13: Iyi, N., Fujii, K., Okamoto, K., Sasaki, T., Appl. Clay Sci. 35, 218-227 (2007)

SUMMARY OF INVENTION

Technical Problem

In view of such circumstances, the purpose of the present invention is to provide a highly crystalline, high-purity, high-stability, versatile, scentless, and non-toxic water-swelling LDH that can produce high-quality LDH nanosheets in various sizes, crystal size falling within a range from 0.1 to 10 μm for example, a method for synthesizing the same, gel or sol substance generated by using the water-swelling LDH, double hydroxide nanosheets, and a method for producing the same.

Solution to Problem

Since organic carboxylate anions used for water-swelling LDH are short-chain carboxylate ions in many cases, the inventors considered that good balance between hydrophilic property of ion moiety and hydrophobic property of organic moiety is ensured and water-swelling property is exhibited only when the chain is short. Furthermore, transformation into carbonate ion-type LDH and discharge of acetic acid following the transformation were concluded to occur in LDH containing acetate anions because carboxylic acids such as acetic acid exhibit mild acidity of the same level as the carbonic acid generated from carbon dioxide in the atmosphere.

Based on the above two concepts, short-chain organic sulfonate anions having highly acidic sulfonic group were assumed to be promising as an anion candidate, and LDH including various short-chain organic sulfonate anions were synthesized to examine their water-swelling property.

As a result, various LDHs including isethionate (2-hydroxyethane-1-sulfonic acid) anions were found to exhibit significant water-swelling property.

Consequently, the purpose of the present invention is to provide a water-swelling layered double hydroxide, a method for producing the same, gel or sol substance generated by using the water-swelling layered double hydroxide, high-quality double hydroxide nanosheets, and the method for producing the same.

The water-swelling layered double hydroxide of the present invention is characterized in that it has organic sulfonate anions ($A^-$) and that it is represented by general formula (1) shown below:

[Chemical Formula 1]

$$Q_zR(OH)_{2(z+1)}(A^-)_{(1-y)}(X^{n-})_{y/n} \cdot mH_2O \qquad (1)$$

In the above formula, Q represent divalent metal, R represents trivalent metal, $A^-$ represents organic sulfonate anion, and m is a real number larger than 0. z falls within the following range: $1.8 \leq z \leq 4.2$. $X^{n-}$ represents anion of a valence of n remaining without being replaced by $A^-$, where n is 1 or 2. y represents the remaining content of $X^{n-}$ where y falls within the following range: $0 \leq y < 0.4$.

The organic sulfonate anion ($A^-$) is desirably isethionate anion represented by chemical formula $HOC_2H_4SO_3^-$. Q represents divalent metal, and specifically metal selected from a group of Mg, Mn, Fe, Co, Ni, Cu, Zn, and Ca is desirable. R represents trivalent metal, and specifically metal selected from a group of Al, Ga, Cr, Mn, Fe, Co, Ni, and La is desirable.

The method for producing the water-swelling layered double hydroxide of the present invention is characterized in that a layered double hydroxide having a composition represented by general formula (2) shown below is dispersed in a solution obtained by dissolving a compound containing organic sulfonate anion ($A^-$) represented by general formula (3) shown below in water or in organic solvent, and that $X^{n-}$ and $A^-$ are subjected to anion exchange.

[Chemical formula 2]

$$Q_zR(OH)_{2(z+1)}(X^{n-})_{1/n} \cdot mH_2O \qquad (2)$$

In the above formula, z falls within the following value range: $1.8 \leq z \leq 4.2$, Q represents divalent metal ion, R represent trivalent metal ion, and m is a real number larger than 0. $X^{n-}$ is $Cl^-$, $Br^-$, $NO_3^-$, $ClO_4^-$, or $ClO_3^-$ when n=1, and $CO_3^{2-}$ when n=2.

[Chemical formula 3]

$$[L^{n+}]_{1/n}[A^-] \qquad (3)$$

In the above formula, $L^{n+}$ represents positive ion of a valence of n, n falls within the following range: $1 \leq n \leq 3$, $L^{n+}$ are $Na^+$, $NH_4^+$, $Li^+$, $K^+$, or $H^+$ when n=1, $Mg^{2+}$, $Ca^{2+}$, $Sr^{2+}$ or $Ca^{2+}$ when n=2, and $Al^{3+}$ when n=3.

Q represents divalent metal, and metal selected from a group of Mg, Mn, Fe, Co, Ni, Cu, Zn, and Ca is desirable. R represents trivalent metal, and metal selected from a group of Al, Ga, Cr, Mn, Fe, Co, Ni, and La is desirable.

In the general formula (3) shown above, [$L^{n+}$] is desirably selected from a group of $Na^+$, $NH_4^+$, $Li^+$, $K^+$, $H^+$, $Mg^{2+}$, $Ca^{2+}$, $Sr^{2+}$, $Ca^{2+}$, and $Al^{3+}$.

The gel or sol substance of the present invention is characterized in that it is obtained by allowing the water-swelling layered double hydroxide of the present invention to swell in a solvent consisting primarily of water.

The solvent consisting primarily of water is desirably water or a mixed solvent containing water at 50 mol % or higher and the rest is water-soluble organic solvent.

The double hydroxide nanosheet of the present invention has a composition represented by general formula (4) shown below:

[Chemical formula 4]

$$[Q_zR(OH)_{2(z+1)}]^+ \qquad (4)$$

In the above formula, Q represents divalent metal, R represents trivalent metal, and z falls within the following range: $1.8 \leq z \leq 4.2$. Examples of desirable metal for Q and R are as described above.

The thickness of the double hydroxide nanosheet is desirably 0.5 nm or thicker and up to 10 nm.

A method for producing the double hydroxide nanosheet of the present invention is characterized in that it is generated from the water-swelling layered double hydroxide of the present invention by using a solvent consisting primarily of water. The solvent consisting primarily of water is water or a mixed solvent, and it is desirable that the mixed solvent contain water at 50 mol % or higher, and that the rest be water-soluble organic solvent.

Advantageous Effect of Invention

The water-swelling layered double hydroxide of the present invention has organic sulfonate anions ($A^-$) between layers, is represented by general formula (1), is a chemical compound having excellent stability, and exhibits water-swelling property.

The method for producing the water-swelling layered double hydroxide of the present invention comprises dispersing a layered double hydroxide having a composition represented by general formula (2) in a solution obtained by dissolving a compound containing organic sulfonate anions ($A^-$) represented by general formula (3) in water or in an organic solvent to allow anion exchange between $X^{n-}$ and $A^-$ to occur. Since the initial LDH as a starting material is produced by the anion exchange method in the present invention, a high-purity water-swelling layered double hydroxide having the same particle size and shape as those of the initial LDH can be obtained.

Since the gel or sol substance of the present invention is generated by allowing the water-swelling layered double hydroxide of the present invention to swell in a solvent consisting primarily of water, it provides excellent safety, and can be formed easily in a thin film or a self-supported film as disclosed in Patent Literature 6, unlike other methods using organic solvent such as formamide.

With the method for producing the double hydroxide nanosheets of the present invention, since a solvent consisting primarily of water is used for layer-by-layer stacking of nanosheets, the colloidal solution containing double hydroxide nanosheets can be used as it is for the stacking process.

DESCRIPTION OF EMBODIMENTS

The water-swelling layered double hydroxide (hereinafter referred to as water-swelling LDH) of the present invention, the method of producing the same, gel or sol substance, double hydroxide nanosheet, and the method for producing the same will hereinafter be described in detail by referring to Examples.

<Water-Swelling LDH>

The water-swelling LDH of the present invention is a chemical compound represented by general formula (1).
[Chemical formula 5]

$$Q_zR(OH)_{2(z+1)}(A^-)_{(1-y)}(X^{n-})_{y/n} \cdot mH_2O \quad (1)$$

In the above formula, Q represents divalent metal, R represents trivalent metal, and $A^-$ represents organic sulfonate anion. m is a real number larger than 0, and z falls within the following range: $1.8 \leq z \leq 4.2$. $X^{n-}$ represents the anion of valence of n remaining without being substituted by $A^-$, where n is 1 or 2. y represents the remaining content of $X^{n-}$, and falls within the following range: $0 \leq y < 0.4$.

As described above, $A^-$ represents organic sulfonate anion, and favorably isethionate anion. Isethionic acid is also referred to as 2-hydroxyethane-1-sulfonic acid, and its anion is represented by chemical formula $HOC_2H_4SO_3^-$.

Q represents divalent metal, and specifically metal selected from a group of Mg, Mn, Fe, Co, Ni, Cu, Zn, and Ca is desirable.

R represents trivalent metal, and specifically metal selected from a group of Al, Ga, Cr, Mn, Fe, Co, Ni, and La is desirable.

The range of z described above is a composition range well known as that of LDH (Non-patent Literatures 2 to 4).

$X^{n-}$ represents anions of valence of n contained in initial LDH to synthesize water-swelling LDH of the present invention, and $X^{n-}$ represents anions other than $A^-$. Consequently, $X^{n-}$ may represent various anions, and such anions include, but not limited to, $CO_3^{2-}$, $ClO_4^-$, $Cl^-$, $NO_3^-$, $Br^-$, $I^-$, and $ClO_3^-$. There may be only one type of anion, but two ore more types of anions may coexist.

y falls within the following range: $0 \leq y < 0.4$. If $X^{n-}$ ions are substituted completely by organic sulfonate anions ($A^-$) (100% replacement ratio), y=0. However, as a result of relaxing anion exchange reaction conditions to be described later, anions ($X^{n-}$) remain without being substituted. Even if ions other than organic sulfonate anions coexist at the ratio of approximately 20%, the water-swelling LDH of the present invention swells in water. However, due to decrease in purity, the performance of colloidal solution such as degree of transparency decreases. It is therefore desirable that organic sulfonate anions be contained at the ratio of 80% or higher, y is desirably 0.2 or lower, and more preferably 0.1 or lower.

m represents the amount of water existing between layers, and is a real number larger than 0. Since this value fluctuates significantly depending on the relative humidity of the atmosphere, it makes no sense to specify a specific range.

Figure 1:
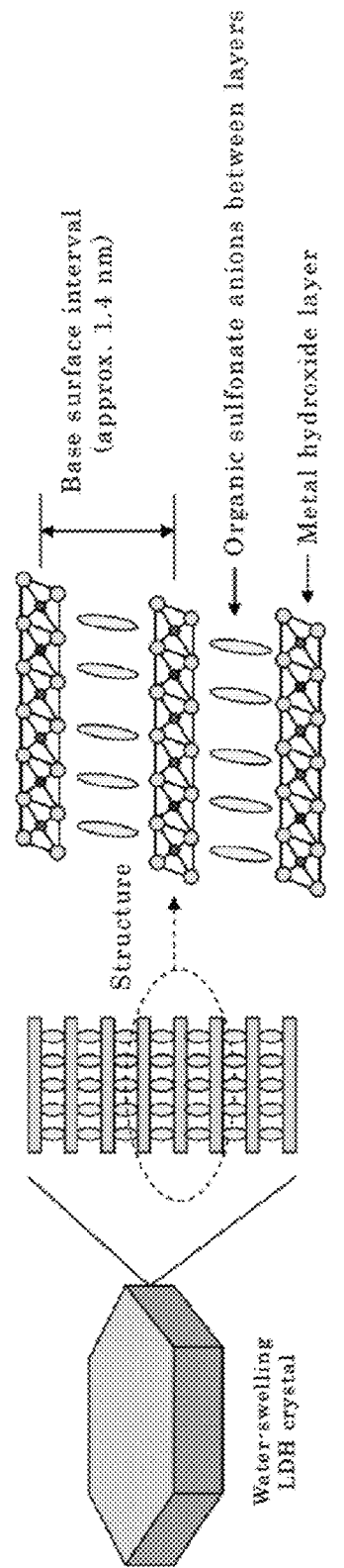
FIG. 1 is a diagram illustrating the structure of the water-swelling layered double hydroxide of the present invention.

FIG. 1 is a diagram illustrating the structure of water-swelling LDH of the present invention. Organic sulfonate anions ($A^-$) exist between the metal hydroxide layers, namely metal octahedrons made of metals Q, R and OH, thus forming LDH crystal. The interlayer space also contains water molecules. Crystalline shapes of the LDH include a hexagon as shown in the figure and ellipse, but are not limited to these. The crystal size mostly falls within a range from 0.1 to 10 μm, and the crystal thickness is approximately from 0.01 to 1 μm.

The thickness of a metal hydroxide layer is approximately 0.5 nm. The basal spacing (distance between the base surfaces of the layers placed adjacent to each other) varies depending on the relative humidity of the atmosphere. When $A^-$ represents isethionate anion, the interval is approximately 1.4 nm. The water-swelling LDH can swell in water by taking up many water molecules between layers.

<Method for Producing Water-Swelling LDH>

The water-swelling LDH of the present invention is synthesized by immersing LDH having a composition represented by general formula (2) shown below (hereinafter referred to as initial LDH) in a solution obtained by dissolving salt containing organic sulfonate anion ($A^-$) represented by general formula (3) shown below in water or in organic solvent such as methanol and ethanol, and thus causing anion exchange between $X^-$ and $A^-$ to occur.
[Chemical formula 6]

$$Q_zR(OH)_{2(z+1)}(X^{n-})_{1/n} \cdot mH_2O \quad (2)$$

In formula (2) shown above, z falls within the following range: $1.8 \leq z \leq 4.2$, Q represents divalent metal ion, and R represents trivalent metal ion. m is a real number larger than 0, and as described above, varies depending on relative humidity, and consequently it makes no sense to specify its specific value range. $X^{n-}$ is $Cl^-$, $Br^-$, $NO_3^-$, $ClO_4^-$, or $ClO_3^-$ when n=1, and $CO_3^{2-}$ when n=2.
[Chemical formula 7]

$$[L^{n+}]_{1/n}[A^-] \quad (3)$$

$A^-$, Q, R, and z in the above general formulae (1), (2), and (3) are as described above.

$L^{n+}$ in general formula (3) represents positive ion of a valence of n, and n falls within the following range: $1 \leq n \leq 3$. Specifically, $L^{n+}$ is $Na^+$, $NH_4^+$, $Li^+$, $K^+$, or $H^+$ when n=1, $Mg^{2+}$, $Ca^{2+}$, $Sr^{2+}$, or $Ca^{2+}$ when n=2, and $Al^{3+}$ when n=3. $Na^+$ or $NH_4^+$ is desirable from the viewpoint of availability.

When sodium isethionate, which is obtained when $L^{n+}=Na^+$ is satisfied in general formula (3), is used, commercially available chemicals (purity of 98% in general) may contain inorganic sulfated compounds such as sodium sulfate and sodium hydrogen sulfate as impurities. Since these compounds are insoluble to methanol, it is desirable that insoluble matter be separated/removed from the methanol solution by filtering before use.

No specific toxicity of sodium isethionate has been reported, and it is used as an additive in cosmetic products. Since it is generated in human body as metabolite of taurine contained in beverages, even if the water-swelling LDH of the present invention contacts human body and isethionate anions are discharged, no harm will be caused.

The z value in general formula of initial LDH (2) and that in general formula of water-swelling LDH (1) both fall within the range $1.8 \leq z \leq 4.2$ because anion exchange reaction does not cause change in the ratio of metals constituting the metal hydroxide layer.

Figure 2:
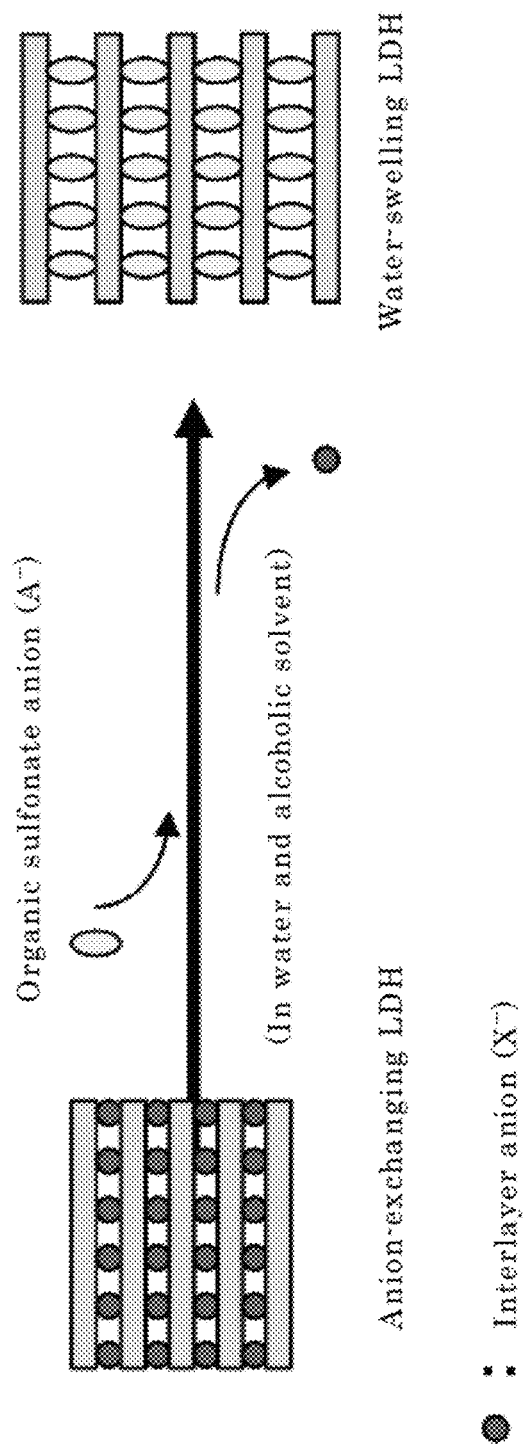
FIG. 2 is a diagram illustrating a scheme of producing water-swelling layered double hydroxide by anion exchange of the present invention.

FIG. 2 illustrates the scheme of producing water-swelling LDH by anion exchange of the present invention.

The method for producing the water-swelling LDH of the present invention adopts the ion exchange method, which is capable of maintaining the shape of initial LDH. Consequently, it is possible to use initial LDH having high crystallinity as a starting material, a process of "reconstruction is not necessary unlike conventional producing method of water-swelling LDH, and water-swelling LDH having higher purity can be obtained. It is therefore a very simple method for obtaining LDH nanosheets easily, with their sizes and shapes controlled.

<Gel or Sol Substance>

The gel or sol substance of the present invention is generated by allowing the water-swelling LDH of the present invention to swell in a solvent consisting primarily of water.

Figure 3:
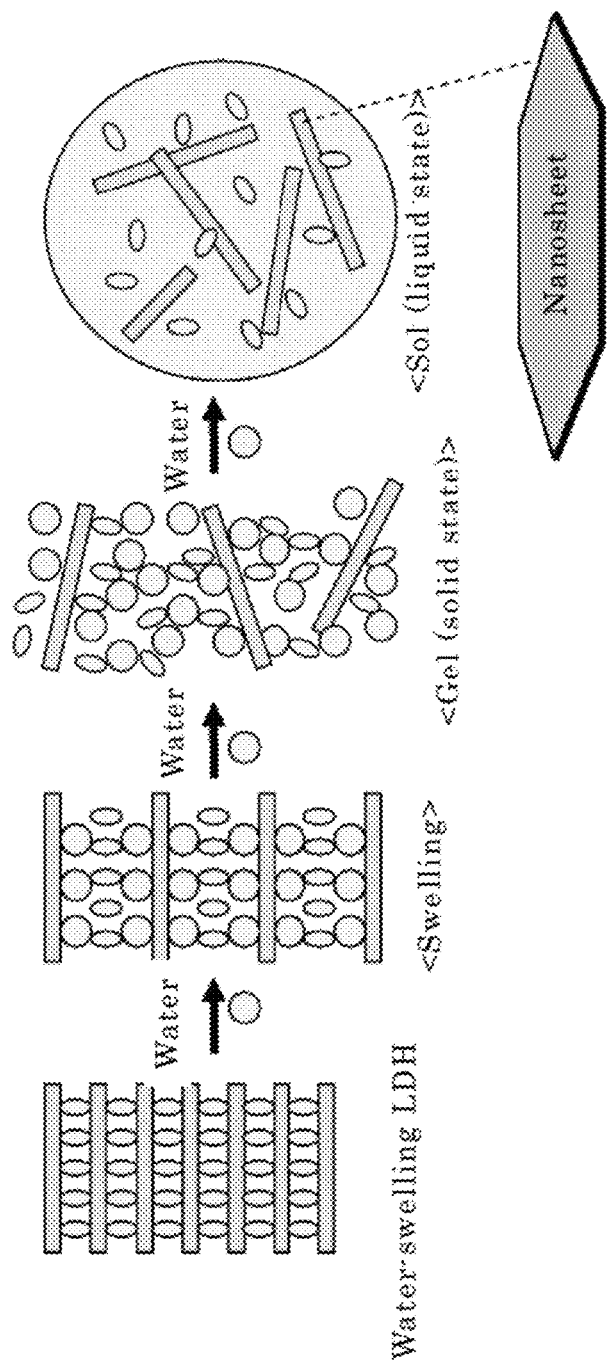
FIG. 3 is a diagram illustrating the state of gel and sol, double hydroxide nanosheets, and their generation process of the present invention.

FIG. 3 is a diagram illustrating gel and sol substances and their generation process in the embodiment of the present invention. The figure illustrates the process where the interlayer space expands as a result of water molecules entering between the metal hydroxide layers of water-swelling LDH, and by the further adding water, the water-swelling LDH changes into gel and sol substances. As a result of water entering into the interlayer space between metal hydroxide layers of the water-swelling LDH, swelling occurs, weakening the bonding between layers gradually, and thus gel substance (solid state) and sol substance (liquid state) are generated. More specifically, the water-swelling LDH swells in a solvent consisting primarily of water, more water molecules are inserted between layers, the basal spacing, namely the distance between the center of a layer to that of another layer, increases, and finally, the layers are delaminated from each other. The solvent consisting primarily of water is desirably water, or a mixed solvent consisting of water at 50 mol % or higher, with the rest being a water-soluble organic solvent.

<Double Hydroxide Nanosheet>

The double hydroxide nanosheet of the present invention has a composition represented by general formula (4) shown below:

[Chemical formula 8]

$$[Q_z R(OH)_{2(z+1)}]^+ \quad (4)$$

In the above formula, Q represents divalent metal, R represents trivalent metal, and z falls within the following range: $1.8 \leq z \leq 4.2$. Specific metals for Q and R are as described previously.

The double hydroxide nanosheet is derived from metal hydroxide layers that form the water-swelling LDH of the present invention, and is made up of the divalent and trivalent metals and OH described previously.

The double hydroxide nanosheet is a single metal hydroxide layer, but the number of layers is not limited to only one, and two to approximately five layers may be included. The thickness ranges approximately from 0.5 to 10 nm. The shape of the double hydroxide nanosheet in planer view reflects the crystalline shape of the water-swelling LDH. For example, from the water-swelling LDH crystal in a shape of a hexagonal plate as shown in FIG. 1, hexagonal nanosheets are formed.

<Method for Producing Double Hydroxide Nanosheet>

The method for producing double hydroxide nanosheet of the present invention is characterized in that it is produced by swelling and delaminating the water-swelling LDH of the present invention using a solvent consisting primarily of water.

FIG. 3 illustrates typical double hydroxide nanosheets of the present invention and their generation process. Specifically, the water-swelling LDH swells in a solvent consisting primarily of water, and subsequently a state where layers are delaminated from each other is reached.

Only by immersing the water-swelling LDH in a solvent consisting primarily of water, double hydroxide nanosheets can be produced easily.

As described above, the present invention has the following advantages:
(1) The water-swelling LDH of the present invention has excellent stability and is scentless.
(2) Since the water-swelling LDH is synthesized by anion exchange, with highly crystalline LDH having anion exchange property used as a starting material, cumbersome operation is not necessary.
(3) Even LDH having high layer charge density can be formed into water-swelling LDH.
(4) Anion exchange can take place without changing the crystal shape and size, and furthermore since the nanosheets succeed that shape, nanosheets of arbitrary size and shape can be obtained.
(5) The reagents used are easily available at low cost, and they are not toxic or dangerous.
(6) The LDH nanosheets of the present invention are components of layer-by-layer assembly, and in addition, since they exist in water in a state where each LDH layer exists in water apart from each other, improvement in reactivity is expected, and thus water-swelling LDH is expected to be formed with various anions and molecules that have never been included in normal ion exchange.

The present invention will hereinafter be described in detail by referring to Examples. Following examples are shown for assisting comprehension of this invention easily, therefore it is not restricted this invention to the examples.

Example 1

In this Example, commercially available hydrotalcite (DHT-6, Kyowa Chemical Industry Co., Ltd., Particle size distribution: approximately 0.1 to 1 μm, Mg/Al molar ratio: 2.99 (±0.06)), which includes Mg ions as divalent metal ions and Al ions as trivalent metal ions, and is represented by general formula $Mg_3Al(OH)_8(CO_3^{2-})_{0.5} \cdot 2H_2O$, was used. This LDH will hereinafter be designated as $CO_3^{2-}$-MgAl-LDH3 or carbonate ion-type MgAl-LDH3.

(Conversion from Carbonate Ion-Type MgAl-LDH3 to Perchlorate Ion-Type MgAl-LDH3)

By adopting the method disclosed in Patent Literature 8 and Non-patent Literature 12, carbonate ion-type MgAl-LDH3 was converted into perchlorate ion-type MgAl-LDH3

(ClO$_4$-MgAl-LDH3). This method will hereinafter be referred to as conversion method 1.

First, by using 0.1 mol/L acetic acid buffer solution having acetic acid ratio, namely the ratio of acetic acid molar quantity to the total molar quantity of acetic acid and sodium acetate, of 0.127, a mixed solution of acetic acid buffer solution and NaClO$_4$ having NaClO$_4$ concentration of 2 mol was prepared. 100 mg of CO$_3$$^{2-}$-MgAl-LDH3 was added to 50 mL of mixed solution of acetic acid buffer solution and NaClO$_4$, and the solution was agitated using a magnetic stirrer in nitrogen gas flow (500 mL/min.) at 25° C. for 18 hours to cause reaction to occur. The solution was then filtered in nitrogen gas flow using a 0.2-μm membrane filter, and deposits were washed thoroughly by degassed water. The filtered deposits were recovered, then the pressure was decreased immediately, the deposits were dried in vacuum for one hour or longer, and 108 mg of white powder was obtained. The degassed water described above is water not containing carbon dioxide prepared by boiling ion-exchanged water for 15 minutes or longer.

In addition to conversion method 1, the following conversion method was also attempted. This method is referred to as conversion method 2.

500 mg of CO$_3$$^{2-}$-MgAl-LDH3 was poured into a three-neck flask, and 45 mL of methanol was added to it to prepare suspended liquid. A solution prepared by dissolving 350 mg of perchloric acid (60%) to 5 mL of methanol was dropped into this suspended liquid while agitating the mixture in nitrogen flow (500 mL/min.) using a magnetic stirrer, and the liquid was further agitated at 25° C. for one hour to cause reaction to occur. The liquid was then filtered in nitrogen gas flow using a 0.2 μm membrane filter, and the deposits were washed thoroughly using methanol. The filtered deposits were recovered, then the pressure was decreased immediately, the deposits were dried in vacuum for one hour or longer, and 561 mg of white powder was obtained. By using ethanol, instead of methanol, the same white powder was obtained.

(Characterization of Perchlorate Ion-Type MgAl-LDH3 (ClO$_4$-MgAl-LDH3))

The basal spacing of the products obtained by conversion methods 1 and 2 was found to be 0.901 nm (RH=0%) by powder X-ray diffraction. This value is mostly identical to the value in Non-patent Literature 13, namely 0.904 nm. There are no other peaks, and the diffraction peak was not broad, which indicates that high-quality ClO$_4$-MgAl-LDH3 without fluctuation in crystallinity has been synthesized.

Figure 4:
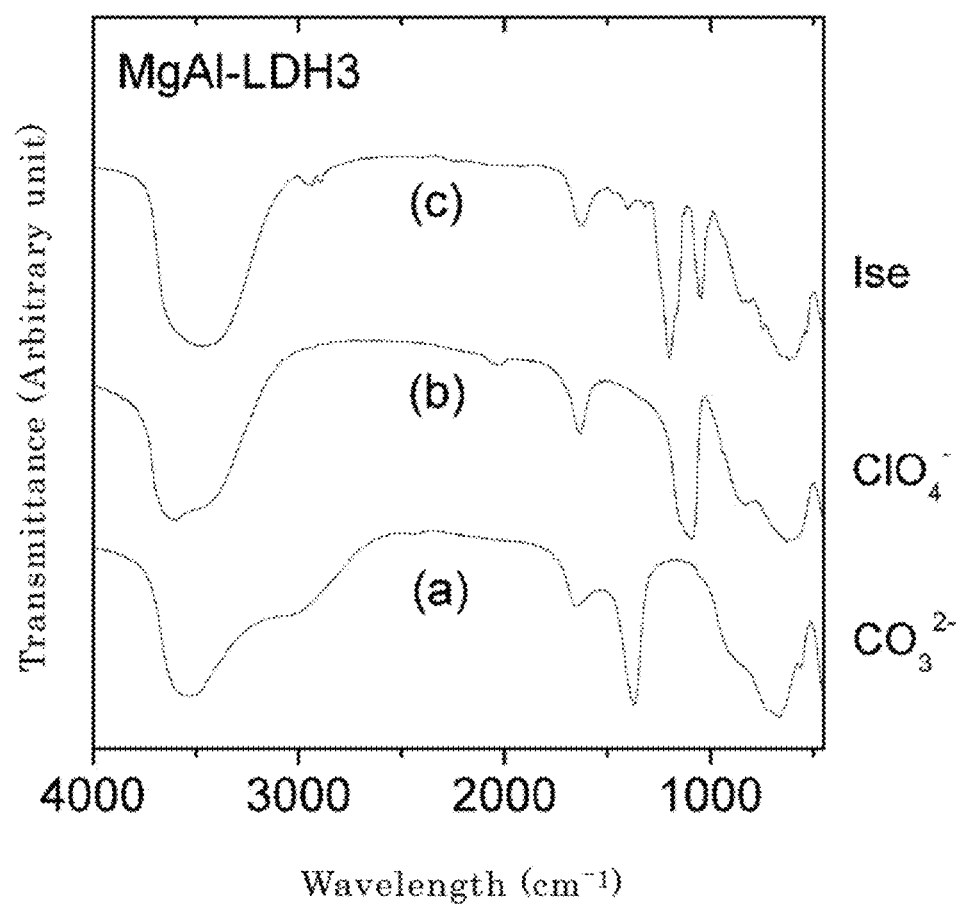
FIG. 4 is a chart showing Fourier transform infrared spectrum (transmittance) of MgAl-LDH3 in Example 1, wherein (a), (b), and (c) respectively represent the spectrum of carbonate ion-type MgAl-LDH3, that of perchlorate ion-type MgAl-LDH3, and that of MgAl-LDH3 containing isethionate anions between layers.

The infrared absorption profile of the products obtained by conversion methods 1 and 2 were measured by Fourier transform infrared spectroscopy (FTIR) using the KBr method. As shown in FIG. 4, since characteristic absorption of ClO$_4$$^-$ was exhibited at 1100 cm$^{-1}$ (FIG. 4 (b)), and absorption of carbonate ion-type MgAl-LDH3 by CO$_3$$^{2-}$ (FIG. 4 (a)) was lost at 1360 cm$^{-1}$, generation of ClO$_4$-MgAl-LDH3 was confirmed.

(Inclusion of Various Sulfonate Anions)

To 20 mg of ClO$_4$-MgAl-LDH3, 10 mL each of 0.067 mol/L methanol solution of the following six types of organic sulfonate (Table 1) was added and ion exchange reaction was made to occur at 25° C. for 20 hours: sodium methanesulfonate, sodium ethanesulfonate, sodium 1-propane sulfonate, sodium 2-methyl-2-propene-1-sulfonate, sodium hydroxymethanesulfonate, and sodium isethionate.

Since insoluble impurities (considered to be sodium hydrogen sulfate and sodium sulfate) were found to be contained in the sodium hydroxymethanesulfonate and sodium isethionate, they were filtered using a 0.2 μm membrane filter, and the filtrate was used.

After the ion exchange reaction, the deposits were filtered out in nitrogen gas flow using a 0.2 μm membrane filter, and the deposits were washed thoroughly using methanol. The filtered out deposits were collected, then the pressure was decreased immediately, the deposits were dried in vacuum for one hour or longer, and white powder was obtained. The obtained white powder was subjected to ion exchange once again under the same conditions.

Table 1 summarizes the organic sodium sulfonates used and their abbreviations. The obtained products are expressed by adding abbreviations of anions, namely, Me, Et, Pr, Mp, Hm, or Ise, as prefix of MgAl-LDH3.

TABLE 1

Organic sodium sulfonates used (RSO$_3$Na) and abbreviations of anions

| R | Name | Abbreviation of anions |
|---|---|---|
| CH$_3$— | Sodium methanesulfonate | Me |
| CH$_3$CH$_2$— | Sodium ethanesulfonate | Et |
| CH$_3$CH$_2$CH$_2$— | Sodium 1-propane sulfonate | Pr |
| CH$_2$=CH$_2$(CH$_3$)CH$_2$— | Sodium 2-methyl-2-propene-1-sulfonate | Mp |
| HO—CH$_2$— | Sodium hydroxymethanesulfonate | Hm |
| HO—CH$_2$CH$_2$— | Sodium isethionate (Sodium 2-hydroxyethane-1-sulfonate) | Ise |

In this Example, as the compound represented by general formula (3) shown above, only sodium salt of organic sulfonic was used, because sodium salt is easily available at the most inexpensive prices, and its solubility in water is high. However, since [A$^-$] existing in the solution is important in anion exchange, compounds containing positive ions other than sodium ions represented by general formula (3) shown above may be used.

Figure 5:
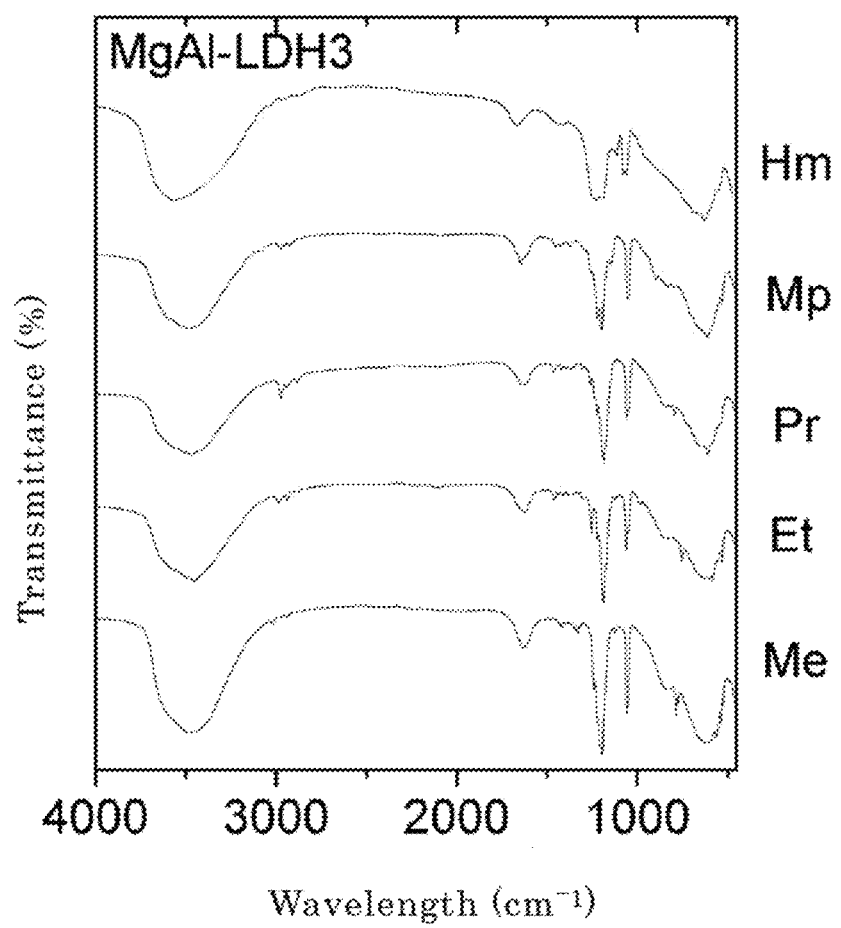
FIG. 5 is a chart showing the Fourier transform infrared spectrum (transmittance) of MgAl-LDH3 including various organic sulfonate anions in Example 1.

FIG. 5 shows the Fourier transform infrared spectrum of each MgAl-LDH3 synthesized. FIG. 4 (c) represents the spectrum of Ise-MgAl-LDH3. Since each exhibited strong absorption at 1040 and 1200 cm$^{-1}$, which is peculiar to organic sulfonate anions, organic sulfonate anion exchange was confirmed to have been performed thoroughly without leaving ClO$_4$$^-$ behind or taking in CO$_3$$^{2-}$, and thus desired anion-exchanged MgAl-LDH3 was confirmed to have been obtained.

The water-swelling property of anion-exchanged MgAl-LDH3 was examined. By adding water, Ise-MgAl-LDH3 only formed viscous gel immediately, and by adding water further, colloidal solution was formed. With anion-exchanged MgAl-LDH3 other than Ise-MgAl-LDH3, low-transparency suspended liquid only was obtained, with no gelation observed.

To examine transmittance of specific amount of light, 0.01 mol/L solution of each was prepared, and transmittance was measured using a visible light/ultraviolet light spectrograph (V-570, JASCO). Measurement wavelength was 589 nm, and 1 cm-square standard crystal cuvette was used. For comparison, the transmittance of the suspended liquid of carbonate ion-type MgAl-LDH3 was also measured.

Figure 6:
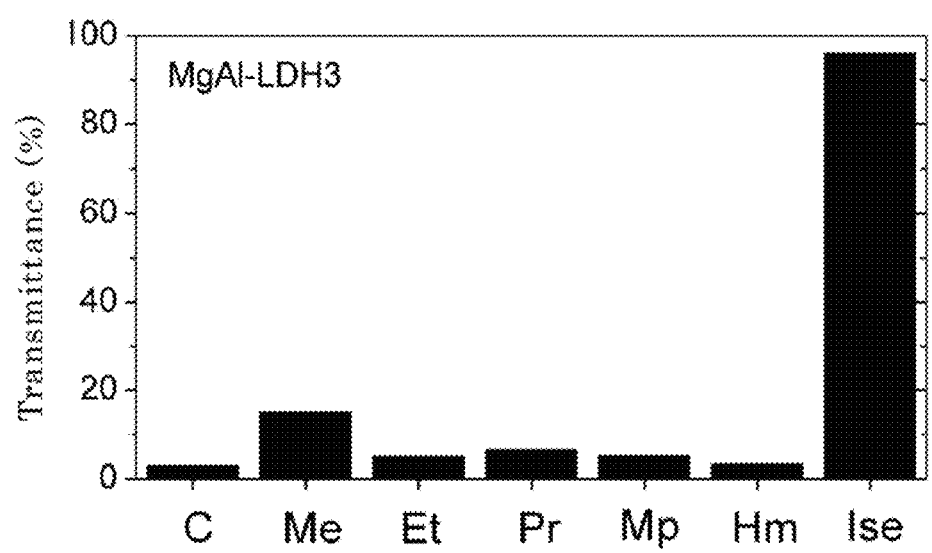
FIG. 6 is a chart showing the transmittance of light (wavelength: 589μm) of MgAl-LDH3 including various organic sulfonate anions in Example 1.

FIG. 6 is a chart showing the transmittance. Abbreviation C in the chart represents carbonate ion-type MgAl-LDH3, and other abbreviations represent various anion-exchanged MgAl-LDH3.

As shown in FIG. 6, Ise-MgAl-LDH3 only exhibited transmittance as high as approximately 96%, and other anion-exchanged MgAl-LDH3 produced suspended liquid having light transmittance approximately as low as that of carbonate ion-type LDH.

Of the organic sulfonate anions shown in Table 1, MgAl-LDH3 including Ise, namely isethionate anions, between $HOC_2H_4SO_3^-$ layers only exhibited water-swelling property, and was confirmed to form high-transparency sol.

Example 2

In this Example 2, LDH containing Mg as divalent metal and Al as trivalent metal and represented by general formula $Mg_2Al(OH)_6(CO_3^{2-})_{0.5} \cdot 2H_2O$ (hereinafter referred to as $CO_3^{2-}$ MgAl-LDH2 or carbonate ion-type MgAl-LDH2) was synthesized. The Mg/Al molar ratio was approximately 2, and the layer electric charge density was higher than that of MgAl-LDH3 in Example 1.

Synthesis of Carbonate Ion-Type MgAl-LDH2 was Performed in Accordance with Patent Literature 9.

Specifically, ion-exchanged water was added to 508 mg of $MgCl_2 \cdot 6H_2O$ and 302 mg of $AlCl_3 \cdot 6H_2O$ to obtain a 12.5-mL solution, to which 12.5 mL of a solution obtained by dissolving 613 mg of hexamethylenetetramine was added, the solution was then filtered using a 0.2 μm membrane filter and placed in a 50-mL pressure-tight Teflon container, which was placed in a pressure-tight stainless container and sealed, and hydrothermal treatment was performed at 140° C. for one day. After the filtration and washing were performed, drying was performed in vacuum, and 279-mg white powder was obtained. The particle size ranged from approximately 0.5 to 2 μm, and Mg/Al molar ratio was 1.94 (±0.04).

Figure 7:
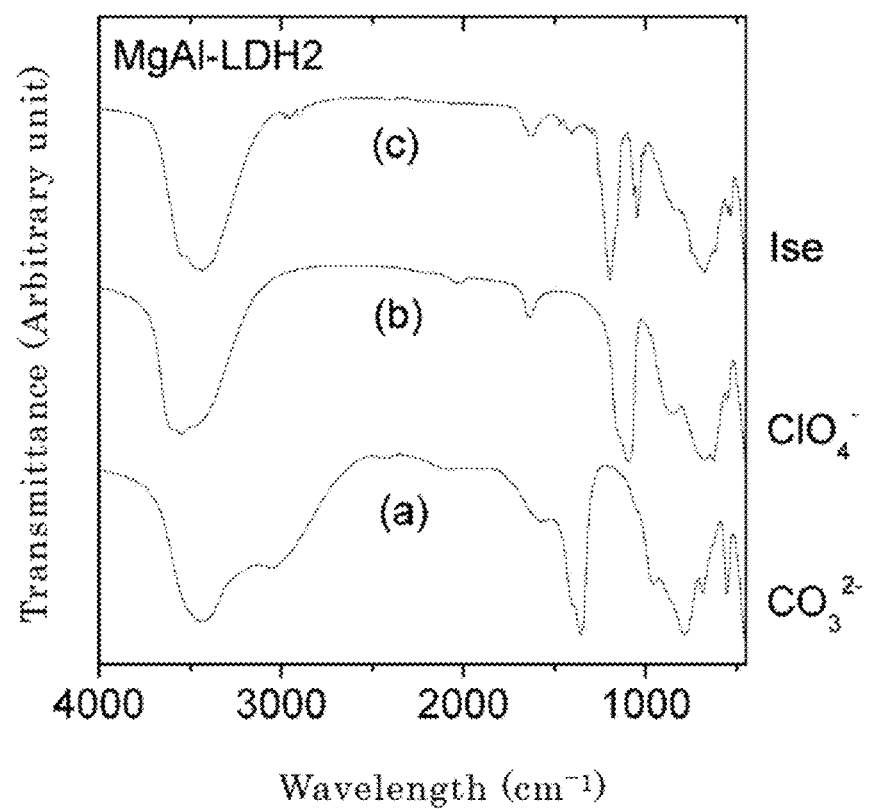
FIG. 7 is a chart showing the Fourier transform infrared spectrum (transmittance) of MgAl-LDH2 in Example 2, wherein (a), (b), and (c) respectively represent the spectrum of MgAl-LDH2 including carbonate ions, that including perchlorate ions, and that including isethionate anions (Ise) between layers.

FIG. 7 (a) shows the FTIR spectrum.

(Conversion from Carbonate Ion-Type MgAl-LDH2 to Perchlorate Ion-Type MgAl-LDH2 ($ClO_4$-MgAl-LDH2))

Using the conversion method 2 described in Example 1, conversion to perchlorate ion type was performed. 202 mg of $CO_3^{2-}$-MgAl-LDH2 was weighed and placed in a three-neck flask, to which 45 mL of methanol was added to prepare suspended liquid. To this suspended liquid, a solution prepared by dissolving 175 mg perchloric acid (60%) in 5 mL of methanol was dropped while agitating the liquid by a magnetic stirrer in nitrogen gas flow (500 mL/min.), and then reaction was made to occur by agitation at 25° C. for one hour. Drying was performed by following the same procedure as Example 1, and 238 mg of white powder was obtained.

(Characterization of Perchlorate Ion-Type MgAl-LDH2)

As a result of powder X-ray diffraction, the product was found to have basal spacing of 0.879 nm (measured at RH=0%), which was mostly identical to the value of Non-patent Literature 13, 0.881 nm. In addition, the diffraction peak waveform demonstrated that crystallinity exhibited almost no change, which indicates that good-quality perchlorate ion-type MgAl-LDH2 has been synthesized.

The infrared absorption profile obtained by FTIR shown in FIG. 7 also demonstrates that characteristic absorption of $ClO_4^-$ was found at 1100 $cm^{-1}$ (FIG. 7 (b)), and that absorption by carbonate ions (FIG. 7 (a)) was lost at 1360 $cm^{-1}$. It was thus confirmed that perchlorate ion-type MgAl-LDH2 has been generated.

(Inclusion of Various Sulfonate Anions)

To 16 mg of perchlorate ion-type MgAl-LDH2, 10 mL each of 0.067 mol/L methanol solution of organic sulfonates shown in Table 1 in Example 1 was added and ion exchange reaction was made to occur at 25° C. for 20 hours. The deposits were dried by following the same procedure as Example 1, and white powder was obtained. The white powder was subjected to ion exchange once again under the same conditions.

The products are respectively abbreviated as Me-MgAl-LDH2, Et-MgAl-LDH2, Pr-MgAl-LDH2, Mp-MgAl-LDH2, Hm-MgAl-LDH2, and Ise-MgAl-LDH2.

Figure 8:
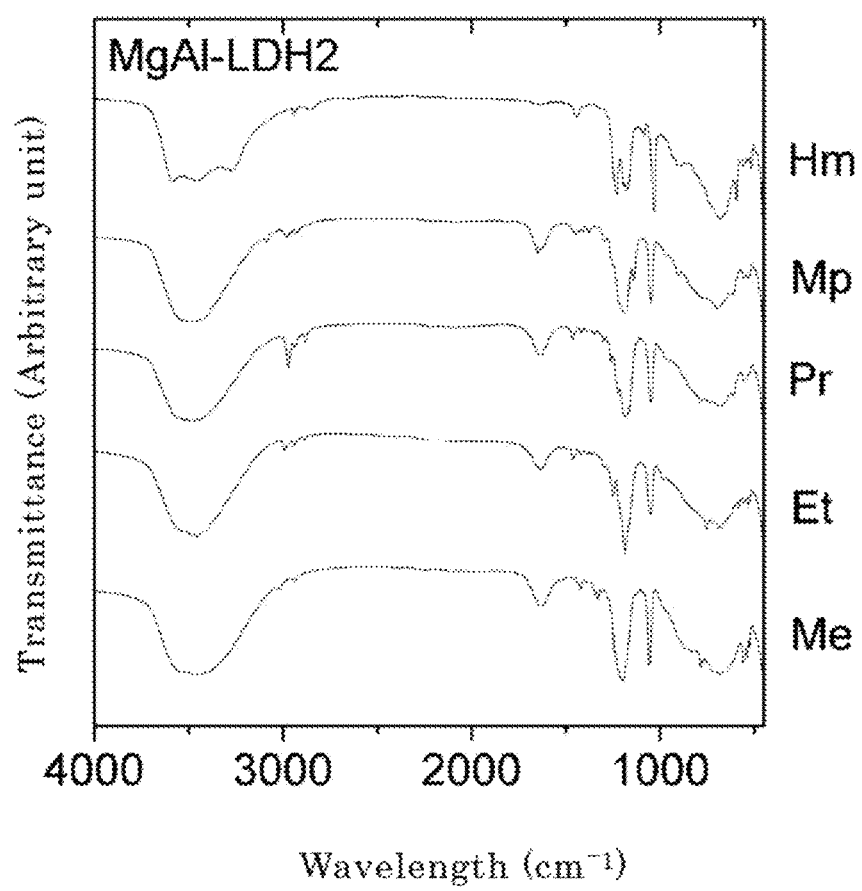
FIG. 8 is a chart showing the Fourier transform infrared spectrum (transmittance) of MgAl-LDH2 including various organic sulfonate anions in Example 2.

FIG. 8 shows the infrared absorption spectrum of each. FIG. 7 (c) shows the spectrum of Ise-MgAl-LDH2.

Since strong absorption specific to organic sulfonate anions is exhibited at 1040 and 1200 $cm^{-1}$, anion exchange is confirmed to have been performed thoroughly, and desired anion-exchanged MgAl-LDH2 is confirmed to have been obtained without leaving $ClO_4^-$ behind or taking in $CO_3^{2-}$.

The water-swelling property of the obtained anion-exchanged MgAl-LDH2 was examined. By adding water, Ise-MgAl-LDH2 only immediately formed viscous gel, and by adding water further, a colloidal solution was formed. With other anion-exchanged MgAl-LDH2, low-transparency suspended liquid only was obtained, with no gelation observed.

Figure 9:
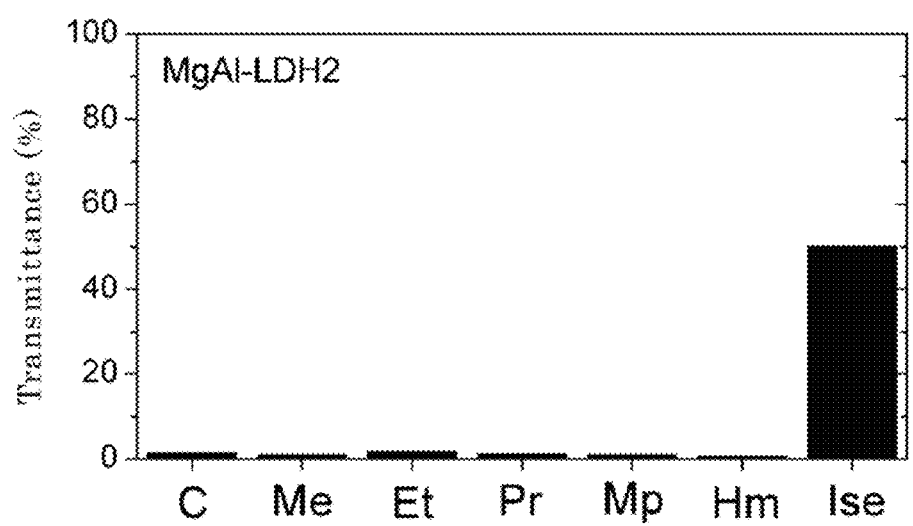
FIG. 9 is a Chart showing the transmittance of light (wavelength: 589 nm) of MgAl-LDH2 including various organic sulfonate anions in Example 2.

To examine light transmittance, a 0.01 mol/L solution was prepared and the transmittance was measured under the same conditions as Example 1. FIG. 9 shows the results obtained. For comparison, C in FIG. 9 exhibits the transmittance of carbonate ion-type MgAl-LDH2 suspended liquid.

Although the degree of transparency is lower than that of Ise-MgAl-LDH3, Ise-MgAl-LDH2 only exhibited much higher transparency (transmittance of approximately 50%) than other LDH2. It was found that, of organic sulfonate anions, MgAl-LDH2 including Ise between layers only exhibited water-swelling property, and thus was found to be able to form high-transparency sol.

Example 3

Since it was found in Examples 1 and 2 that MgAl-LDH3 and MgAl-LDH2 including isethionate anions (Ise) between layers exhibited water-swelling property, thus forming gel or colloidal solution, these two LDHs were analyzed further in detail by powder X-ray diffraction and under scanning electron microscope to characterize their powder state.

Since the basal spacing varies depending on relative humidity, powder X-ray diffraction measurement was performed, with relative humidity in measurement atmosphere changed.

The measurement was performed using a powder X-ray diffraction instrument, Rint1200 (Rigaku Corporation, Japan), and under the following conditions: using CuKα-ray (λ=1.5405 nm), at 40 kV/30 mA, at scanning rate of 2° (2θ)/min, and at 25° C. The relative humidity was adjusted using a device for mixing nitrogen gas (SRG-1R-1, SHINYEI), with nitrogen gas saturated in water at 25° C., and monitored using a humidity/temperature measuring instrument (HMI41, VAISALA).

Figure 10:
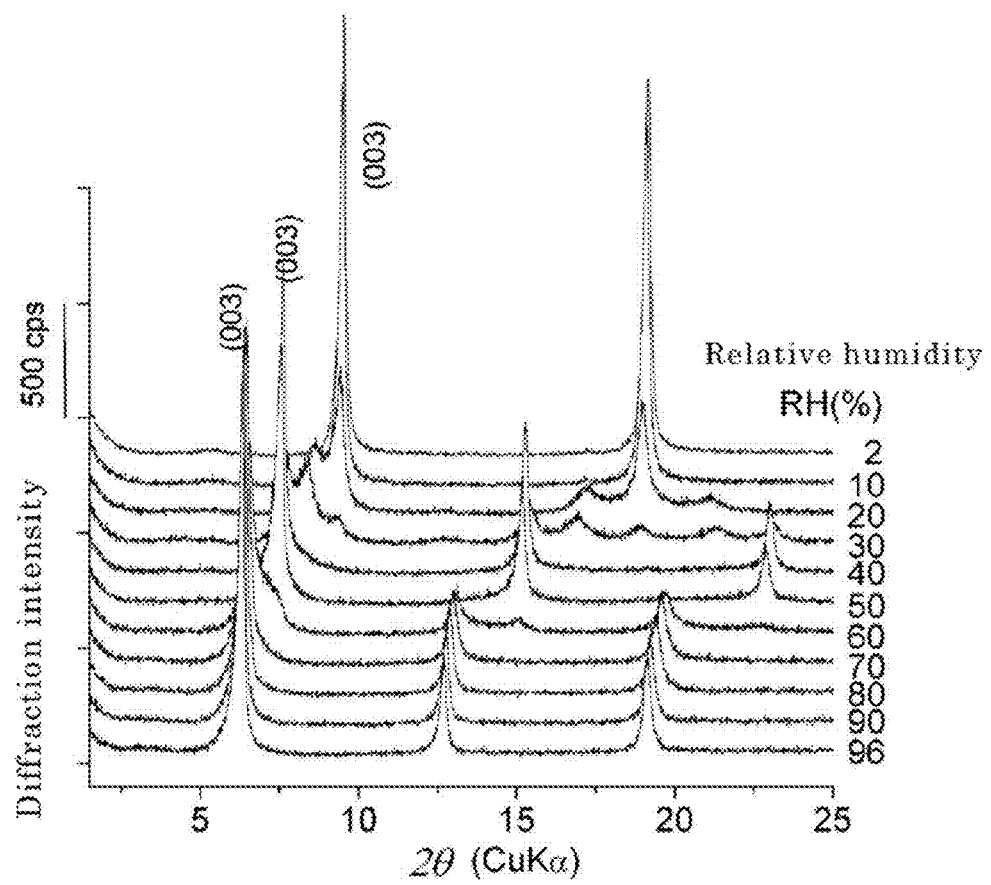
FIG. 10 is a chart showing powder X-ray diffraction profile of Ise-MgAl-LDH3 obtained by changing relative humidity in Example 3.
Figure 11:
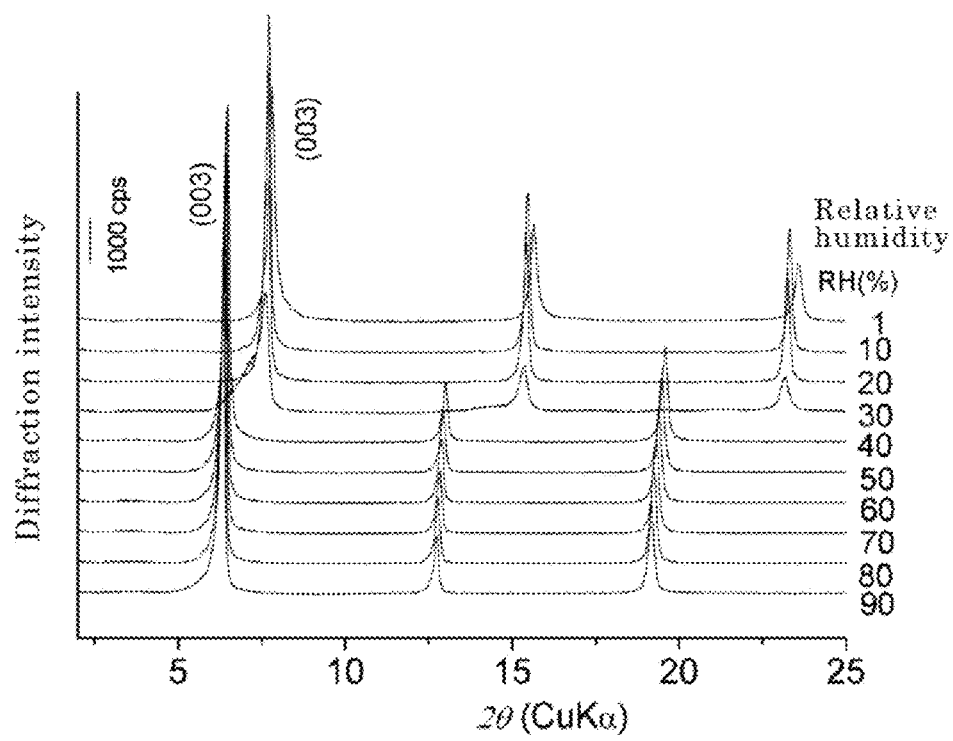
FIG. 11 is a chart showing powder X-ray diffraction profile of Ise-MgAl-LDH2 obtained by changing relative humidity in Example 3.

FIG. 10 demonstrates the change in X-ray diffraction pattern of Ise-MgAl-LDH3, and FIG. 11 shows the change in X-ray diffraction pattern of Ise-MgAl-LDH2. It is apparent that as a result of increase in relative humidity, the basal spacing changed significantly.

Figure 12:
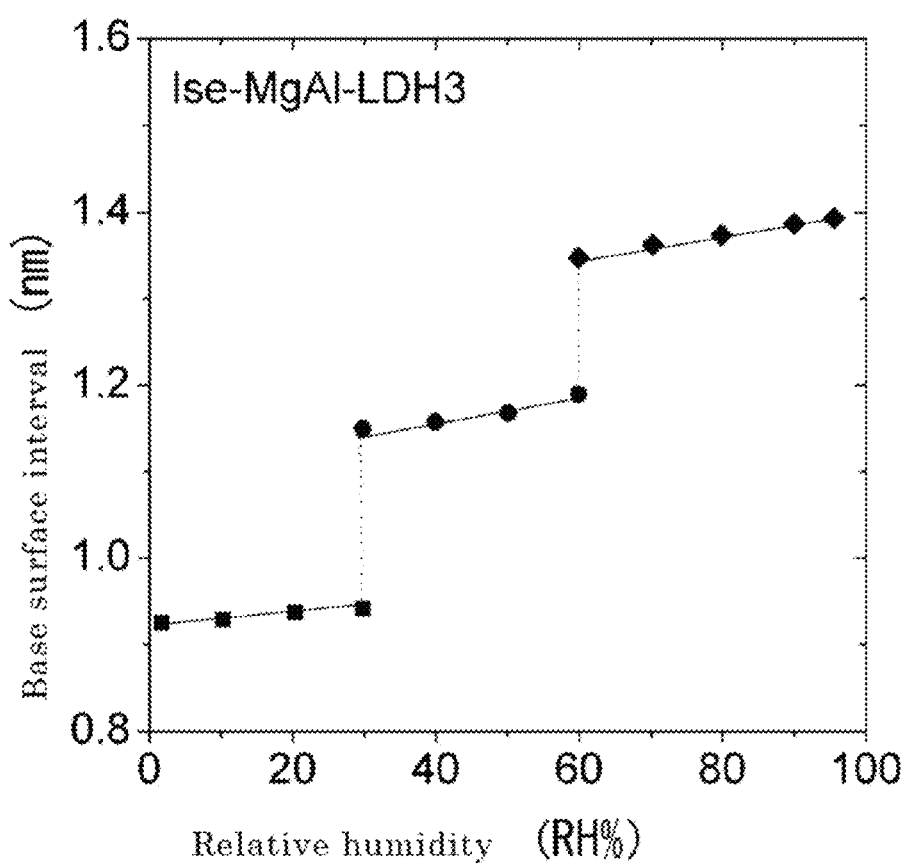
FIG. 12 is a chart showing the change in basal spacing of ISe-MgAl-LDH3 following the change in relative humidity.
Figure 13:
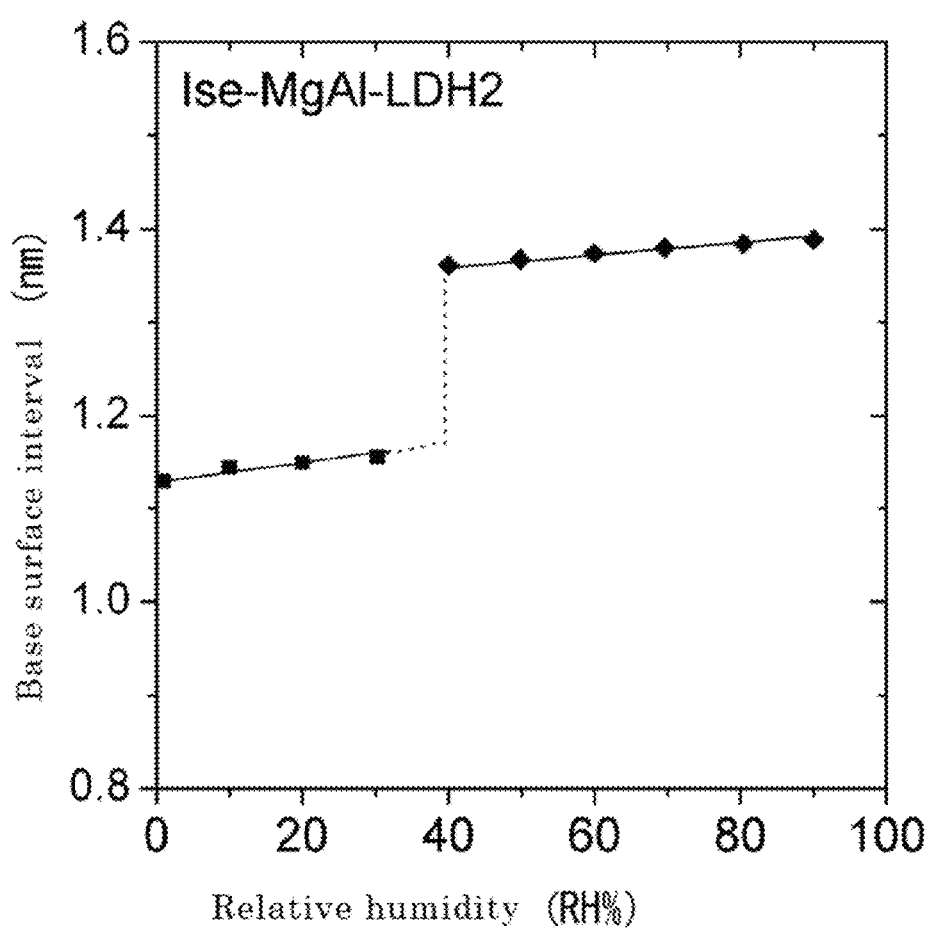
FIG. 13 is a chart showing the change in basal spacing of Ise-MgAl-LDH2 following the change in relative humidity.

FIGS. 12 and 13 show the relation between the basal spacing and relative humidity. It is apparent that with the increase in relative humidity, the basal spacing increased discontinuously. The reason for this is that water molecules are inserted between layers as layers.

Using a scanning electron microscope (JEOL, Japan), the shape of Ise-MgAl-LDH3 and that of Ise-MgAl-LDH2 were observed at accelerating voltage of 15 kV.

Figure 14:
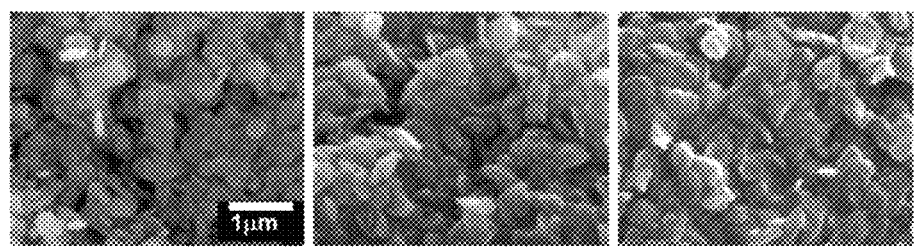
FIG. 14 provides scanning electron microscopic (SEM) images of MgAl-LDH3 in Example 3, wherein FIG. 14 (a), FIG. 14 (b), and FIG. 14 (c) respectively are the image of MgAl-LDH3 including carbonate ions, that including perchlorate ions, and that including isethionate anions (Ise) between layers.

FIG. 14 shows SEM images of MgAl-LDH3. FIG. 14 (*a*) is an image of MgAl-LDH3 including carbonate ions, FIG. 14 (*b*) including perchlorate ions, and FIG. 14 (*c*) including isethionate anions (Ise), between layers. The length of the bar in the FIG. is 1 μm, and the magnification of FIG. 14 (*a*) to FIG. 14 (*c*) is the same.

Figure 15:
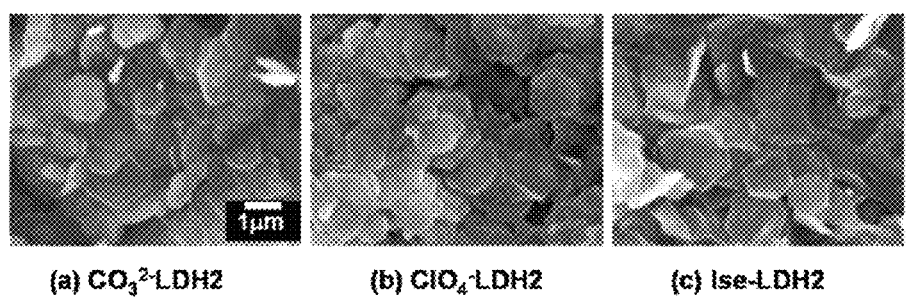
FIG. 15 provides scanning electron microscopic (SEM) images of MgAl-LDH2 in Example 3, wherein FIG. 15 (a), FIG. 15 (b), and FIG. 15 (c) respectively are the image of MgAl-LDH2including carbonate ions, that including perchlorate ions, and that including isethionate anions (Ise) between layers.

FIG. 15 shows SEM images of MgAl-LDH2. FIG. 15 (*a*) is an image of MgAl-LDH2 including carbonate ions, FIG. 15 (*b*) including perchlorate ions, and FIG. 15 (*c*) including isethionate anions (Ise), between layers. The length of the bar in the FIG. is 1 μm, and the magnification of FIG. 15 (*a*) to FIG. 15 (*c*) is the same.

The SEM images show that Ise-MgAl-LDH3 is a disk-shaped crystal structure whose diameter falls within a range approximately from 0.1 to 1 μm, and the shape of carbonate ion-type LDH3 and that of perchlorate ion-type LDH3, namely starting materials, are succeeded. Ise-MgAl-LDH2 is a hexagon-shaped crystal structure whose diameter falls within a range approximately from 0.5 to 2 μm, and the shape of carbonate ion-type LDH3 and that of perchlorate ion-type LDH3, namely starting materials, are succeeded. In other words, the external shape of Ise-MgAl-LDH3 and that of Ise-MgAl-LDH2 are maintained even after ion exchange.

By performing elemental analysis using induction coupled plasma (ICP) luminescence analyzer (SPS1700HVR, Seiko), the Mg/Al molar ratio of Ise-MgAl-LDH2 was found to be 1.96 (±0.04), and that of Ise-MgAl-LDH3 was found to be 2.99 (±0.06). These values are mostly identical to the Mg/Al molar ratio of carbonate ion-type LDH, namely the starting material, which indicates that anion exchange has been performed without changing the layer components.

The C/S ratio was measured using CS-444LS-type carbon/sulfur simultaneous analyzer (for quantitative analysis by radio-frequency heating/combustion-infrared absorption method, LECO), and that of Ise-MgAl-LDH2 was found to be 1.9, and that of Ise-MgAl-LDH3 was found to be 2.0, both of which mostly coincided with the C/S ratio of isethionate anions of 2.0. It was thus exhibited that isethionate anions were not decomposed but included as they were.

Figure 16:
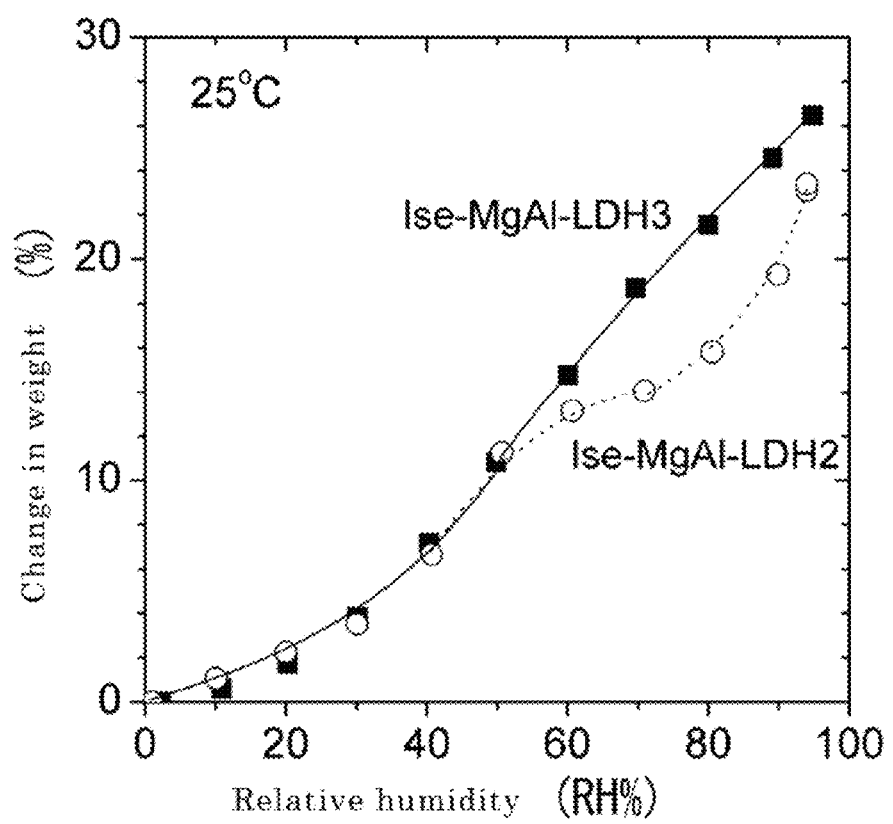
FIG. 16 is a chart showing the change in weight of Ise-MgAl-LDH2 and Ise-MgAl-LDH3 following the change in relative humidity in Example 3.

With Ise-MgAl-LDH3 and Ise-MgAl-LDH2, the relation between relative humidity at 25° C. and change in weight was examined, and FIG. 16 shows the results obtained. The change in weight was examined as follows: with the weight weighed after drying was performed in nitrogen atmosphere for one hour regarded as reference, RH was increased by 10% and retained in that state for 15 minutes, and then weight was measured.

It was found that even at room temperature, if RH was increased to 90%, water was found to have been included by approximately 25% in weight. This value is approximately 10 times that of chlorine ion-type LDH shown in FIG. 16 of Patent Literature 6, namely 3%. The increase was approximately 8% with acetate ion-type MgAl-LDH2 having no water-swelling property, whereas with Ise-MgAl-LDH2 having the same Mg/Al molar ratio of 2, increase by approximately 25% was confirmed, which indicates that Ise-MgAl-LDH2 has higher hydrophilic property and that Ise affects water-swelling property.

Example 2 of Patent Literature 6 describes that if LDH containing acetate anions is exposed to outside air, entry of carbon dioxide occurs with the change in humidity of the outside air, and that in approximately one week to one month, transformation into carbonate ion-type LDH starts to occur.

Both Ise-MgAl-LDH2 and Ise-MgAl-LDH3 were exposed to outside air under open conditions, but no essential change was found in XRD and FTIR profiles even after two months, and transformation resulting from taking in carbonate ions was not observed.

Example 4

Reaction of Ise-MgAl-LDH3 and that of Ise-LDH2 to water were examined in detail.

Figure 17:
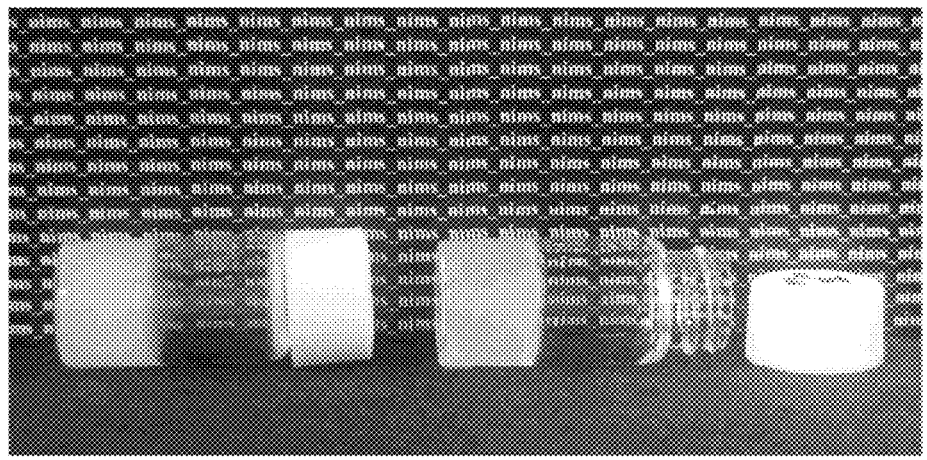
FIG. 17 is an image of (a) Ise-MgAl-LDH2 gel and (b) Ise-MgAl-LDH3 gel in Example 4.

FIG. 17 shows the gel generated by adding 2 mL of water to 200 mg of Ise-MgAL-LDHs. The left image is the gel produced by using Ise-MgAl-LDH2, and the right image is the gel produced by using Ise-MgAl-LDH3. It is apparent that both are in semi-transparent jellied (gel) state so high in viscosity that they do not flow even if the bottles are placed on their sides.

Ise-MgAl-LDH and Ise-MgAl-LDH2 turn into colloidal solution by adding water further. Suspended liquid was prepared under the same conditions as Example 1, and scattering of light was observed.

Figure 18:
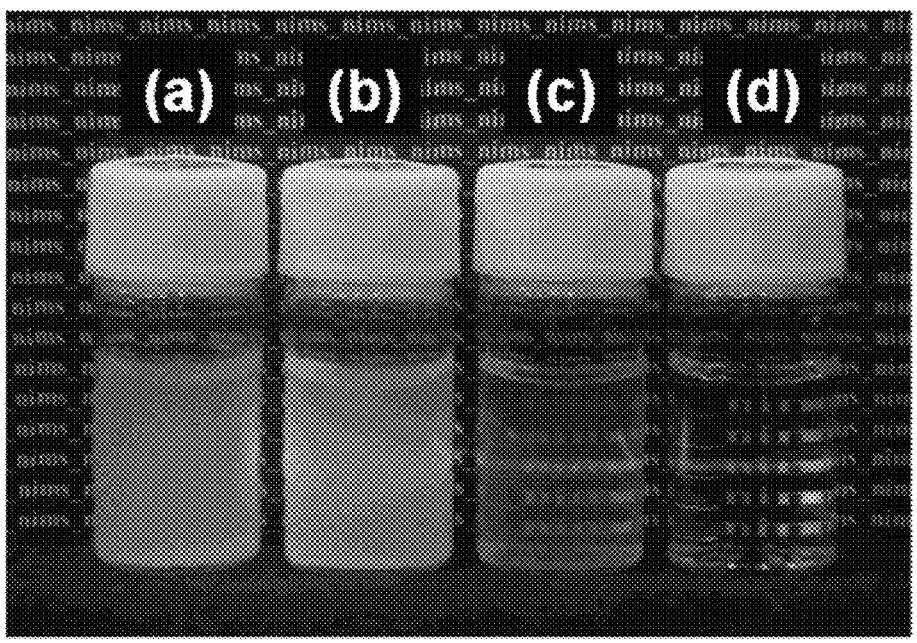
FIG. 18 is an image showing the state of suspension of various 0.01 mol/L LDHs in Example 4, wherein (a), (b), (c), and (d) respectively represent that of carbonate ion-type MgAl-LDH2, that of carbonate ion-type MgAl-LDH3, that of Ise-MgAl-LDH2, and that of Ise-MgAl-LDH3.

FIG. 18 shows the suspended state, wherein (*c*) represents that of the colloidal solution prepared by using Ise-MgAl-LDH2, and (*d*) represents that of the colloidal solution prepared by using Ise-MgAl-LDH3. For comparison, the state of carbonate ion-type MgAl-LDH2 (FIG. 18 (*a*)) and that of carbonate ion-type MgAl-LDH3 (FIG. 18 (*b*)) prepared under the same conditions are also shown.

In FIG. 18, red LED light was irradiated from right side. (*c*) and (*d*) exhibited high transparency, and Tyndall phenomenon was occurring due to formation of nanosheets, whereas in (*a*) and (*b*), scattering of light was occurring due to suspended state of powder.

From these results, it was found that Ise-MgAl-LDH3 and Ise-MgAl-LDH2 had water-swelling property, and highly viscous gel and high-transparency colloidal solution were formed by water.

Ise-MgAl-LDH3 and Ise-MgAl-LDH2 in powder state and gel state were subjected to X-ray diffraction measurement. Furthermore, after the gel was dried in nitrogen gas flow. X-ray diffraction measurement was performed.

Figure 19:
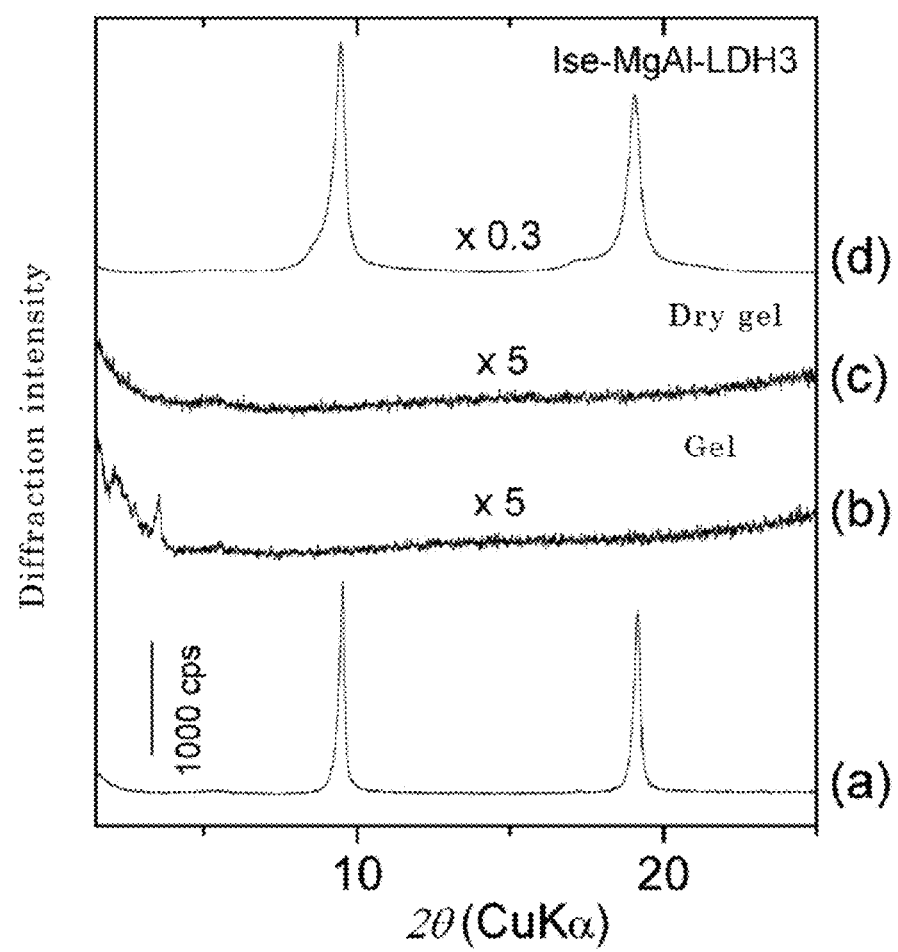
FIG. 19 is powder X-ray diffraction profile of Ise-MgAl-LDH3 in Example 4, wherein (a), (b), (c), and (d) respectively represent that of powder, that obtained immediately after water was dropped onto the powder, that in a state of gel obtained approximately 20 minutes after water was dropped onto the powder, and that of the gel having been dried on a substrate.
Figure 20:
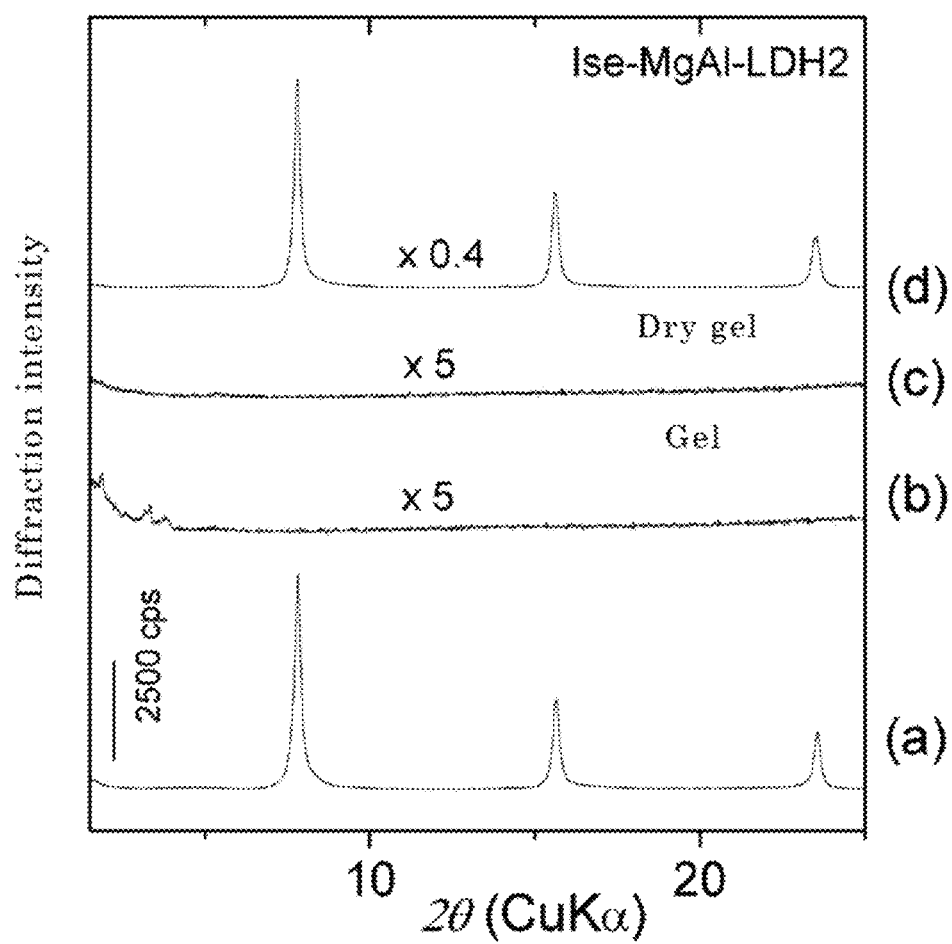
FIG. 20 is power X-ray diffraction profile of ISe-MgAl-LDH2 in Example 4, wherein (a), (b), (c), and (d) respectively represent that of powder, that obtained immediately after water was dropped onto the powder, that in a state of gel obtained approximately 20 minutes after water was dropped onto the powder, and that of the gel having been dried on a substrate.

FIG. 19 shows the result of the analysis of Ise-MgAl-LDH3, and FIG. 20 shows the result of the analysis of Ise-MgAl-LDH2.

In these charts, (*a*) represents the XRD profile of powder state, (*b*) represents that of the state immediately after small amount of water was dropped, (*c*) represents that of the state approximately 20 minutes after the dropping of water, and (*d*) is that of the state after the generated gel was dried in nitrogen gas flow for several hours. The scale of display is as follows: (*b*) and (*c*); magnified 5 times, (*d*): magnified 0.3 times (FIG. 19) or 0.4 times (FIG. 20).

Both with Ise-MgAl-LDH3 and Ise-MgAl-LDH2, the diffraction peak that is clearly exhibited in powder state ((*a*) in the FIGS.) shifted to low-angle side and the peak intensity decreased drastically immediately after the dropping of water ((*b*) in the FIGS.), and the peak was lost completely in approximately 20 minutes after the dropping of water ((*c*) in the FIGS.) The reason for this is that as shown in FIG. 3 (conceptual drawing at right), layers were separated from each other and laid irregularly, and consequently regularity and diffraction peak were lost.

By drying this gel, these diffraction peaks reappeared ((*d*) in the FIGS.) The reason why the peak intensity increased considerably is because regularity increased significantly due to stacking that progressed after separation.

From the results shown in (a) to (d), it is apparent that the LDH layers were delaminated in gel state, and they stacked again by drying. It was proven by XRD analysis also that both with Ise-MgAl-LDH3 and Ise-MgAl-LDH2, water caused delamination of layers, and drying caused re-lamination.

The thickness of LDH nanosheets varies depending on the degree of progress of delamination.

To examine the thickness of LDH nanosheets, surface topography was observed under Seiko E-Sweep atomic force microscope (AFM).

Samples for surface topography were prepared by attaching cationic polymer (PEI) and anionic polymer (PSS) layer by layer onto a Si substrate having been subjected to acid washing, and by allowing cationic LDH nanosheets to adsorb on the layers. The thickness was measured using a canti-lever equipped with silicon chips in 20 N/m tapping mode.

Figure 21:
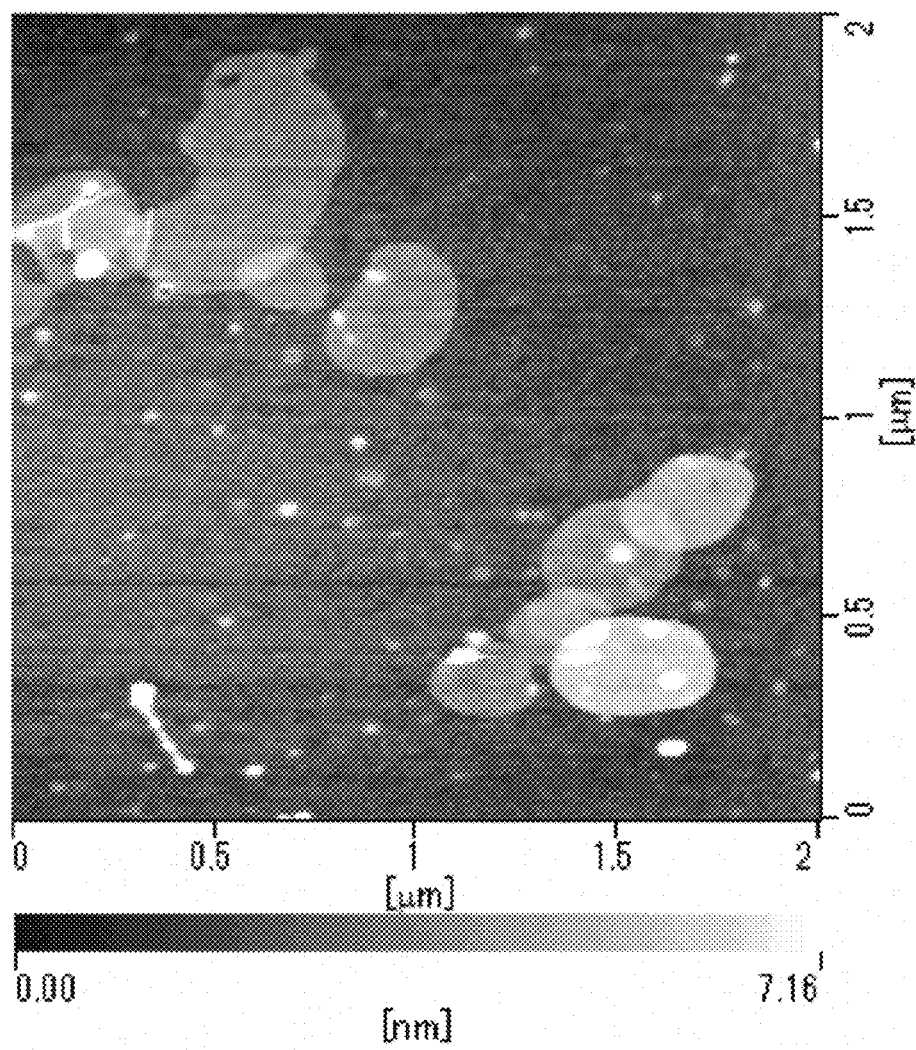
FIG. 21 is an AFM image of Ise-MgAl-LDH3 LDH nanosheet in Example 4 viewed from a direction perpendicular to the substrate.
Figure 22:
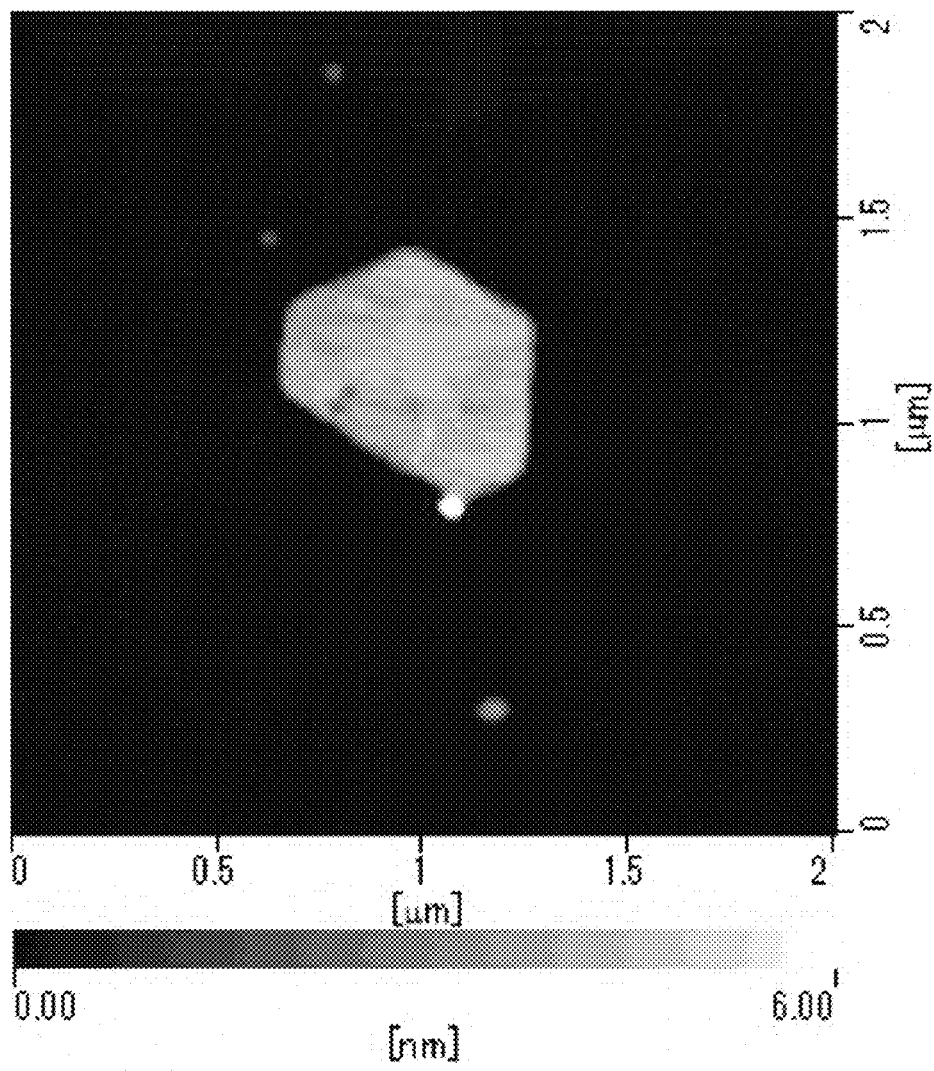
FIG. 22 is an AFM image of Ise-MgAl-LDH2 LDH nanosheet in Example 4 viewed from a direction perpendicular to the substrate.

FIG. 21 is an AFM image of Ise-MgAl-LDH3 LDH nanosheets and FIG. 22 is that of MgAl-LDH2 LDH nanosheets. Both FIGS. show the state Where LDH nanosheets are attached to the substrate observed in a direction perpendicular to the substrate. The thickness is respectively displayed by the shades of gray of the scale shown at the bottom of each FIG.

The thickness of the LDH nanosheets ranges approximately from 1.5 to 2.0 nm, and the sheets are considered to be in single layer. This value is relatively large, compared to the thickness of nanosheets obtained by using formamide of approximately 1 nm, probably due to the attachment of isethionate anions onto the surface of the nanosheets. LDH nanosheets having approximately 2 to 6 layers were also observed. With Ise-MgAl-LDH3, single-layer or double-layer LDH nanosheets were formed in most cases, which suggests that the degree of progress of delamination was rather high. Meanwhile, with Ise-MgAl-LDH2, the number of double-layer to 5-layer LDH nanosheets was larger than single-layer nanosheets, which coincides with the fact that the transmittance of light in colloidal solution is lower in Ise-MgAl-LDH2, and indicates that it is rather difficult to form single-layer LDH nanosheets. The shape shown as SEM images in FIGS. 14 and 15 were maintained as the outer shapes, which indicates that the layers were delaminated as they were to form nanosheets.

From the results described above, it is apparent that Ise-MgAl-LDH3 and Ise-MgAl-LDH2, which are water-swelling LDHs, are delaminated in water, thus forming double-hydroxide nanosheets.

From Examples 3 and 4, the LDH nanosheets obtained by the present invention are regarded as high-quality nanosheets consisting of one to several layers of single-layer sheet. In other words, the present invention has succeeded in obtaining colloidal solution containing LDH nanosheets.

Example 5

Regarding LDH containing Ni ions as divalent metal ions and Al ions as trivalent metal ions, three types of NiAl-LDHs respectively having Ni/Al molar ratio of 2, 3, and 4 were synthesized.

(NiAl-LDH Having Ni/al Molar Ratio of 2)

12.5 mL of mixed solution prepared by dissolving 364 mg of $Ni(NO_3)_2 \cdot 6H_2O$, 235 mg of $Al(NO_3)_3 \cdot 9H_2O$, and 307 mg of hexamethylene tetramine was poured into a 25-mL pressure-tight Teflon container, which was housed in a pressure-tight stainless container and sealed, and hydrothermal treatment was performed at 180° C. for one day. By performing filtration, washing, and drying, 185 mg of blue-green powder was obtained. Particle size fell within a range from 0.3 to 0.6 μm. Ni/Al molar ratio was found to be 2.00 (±0.06) by the ICP analysis performed. This LDH is designated as $CO_3^{2-}$NiAl-LDH2.

Using conversion method 2 described in Example 1, $CO_3^{2-}$NiAl-LDH2 was converted into perchlorate ion-type LDH.

To 155 mg of $CO_3^{2-}$NiAl-LDH2 weighed, 45 mL of methanol was added to produce a suspended solution. To this suspended solution, a solution prepared by dissolving 105 mg of perchloric acid (60%) in 5 mL of methanol was dropped while the solution was agitated using a magnetic stirrer in nitrogen gas flow, and furthermore, reaction was made to occur while the solution was being agitated at 25° C. for one hour. Drying was performed by the same treatment as Example 1, and 180 mg of blue-green powder was obtained.

Using the perchlorate ion-type NiAl-LDH2, ion exchange with isethionate anions was performed.

80 mL of 0.067 mol/L methanol solution of sodium isethionate was prepared and added to 100 mg of $ClO_4$—NiAl-LDH2, and ion exchange reaction was made to occur at 25° C. for 20 hours. The supernatant was removed, the same amount of methanol solution of sodium isethionate was added, and once again, ion exchange was made to occur under the same conditions. Then the solution was filtered using a 0.2 μm membrane filter in nitrogen gas flow, and deposits were washed with methanol. The filtered deposits were dried immediately in vacuum for one hour or longer, and 103 mg of blue-green powder Ise-NiAl-LDH2 was obtained. The Ni/Al molar ratio was 2.00 (±0.04), which was identical to that of the starting material.

(NiAl-LDH Having Ni/al Molar Ratio of 3)

12.5 mL of mixed solution prepared by dissolving 409 mg of $Ni(NO_3)_2 \cdot 6H_2O$, 176 mg of $Al(NO_3)_3 \cdot 9H_2O$, and 254 mg of urea was poured into a 25-mL pressure-tight Teflon container, which was housed in a pressure-tight stainless container and sealed, and hydrothermal treatment was performed at 180° C. for one day. By performing filtration, washing, and drying, 188 mg of product was obtained. Particle size fell within a range from 0.2 to 0.6 μm. Ni/Al molar ratio was 2.91 (±0.06). This LDH is designated as $CO_3^{2-}$NiAl-LDH3.

Using conversion method 2 described in Example 1, $CO_3^{2-}$NiAl-LDH3 was converted into perchlorate ion-type LDH. To 268 mg of $CO_3^{2-}$NiAl-LDH3 weighed, 45 mL of methanol was added to produce a suspended solution. To this suspended solution, a solution prepared by dissolving 140 mg of perchloric acid (60%) in 5 mL of methanol was dropped while the solution was agitated using a magnetic stirrer in nitrogen gas flow, and furthermore, reaction was made to occur while the solution was being agitated at 25° C. for one hour. Drying was performed by the same treatment as Example 1, and 297 mg of blue-green powder was obtained.

Using the perchlorate ion-type NiAl-LDH3, ion exchange with isethionate anions was performed. 80 mL of 0.067 mol/L methanol solution of sodium isethionate was prepared and added to 100 mg of $ClO_4$—NiAl-LDH3, and ion exchange reaction was made to occur at 25° C. for 20 hours. The supernatant was removed, the same amount of methanol solution of sodium isethionate was added, and once again, ion exchange was made to occur under the same conditions. Then the solution was filtered using a 0.2 μm membrane filter in nitrogen gas flow, and deposits were washed with methanol. The filtered out deposits were dried immediately in vacuum for one hour or longer, and 100 mg of blue-green powder Ise-NiAl-LDH3 was obtained. The Ni/Al molar ratio was 2.96 (±0.06), which was nearly identical to that of the starting material.

(NiAl-LDH Having Ni/al Molar Ratio of 4)

12.5 mL of mixed solution prepared by dissolving 436 mg of $Ni(NO_3)_2.6H_2O$, 141 mg of $Al(NO_3)_3.9H_2O$, and 248 mg of urea was poured into a 25-mL pressure-tight Teflon container, which was housed in a pressure-tight stainless container and sealed, and hydrothermal treatment was performed at 180° C. for one day. 223 mg of product was obtained. Particle size fell within a range from 0.2 to 0.8 μm. Ni/Al molar ratio was 3.83 (±0.08).

Using the $CO_3^{2-}$-NiAl-LDH4 obtained, conversion into perchlorate ion-type LDH was performed.

To 329 mg of $CO_3^{2-}$-NiAl-LDH4 weighed, 45 mL of methanol was added to produce a suspended solution. To this suspended solution, a solution prepared by dissolving 140 mg of perchloric acid (60%) in 5 mL of methanol was dropped while the solution was agitated using a magnetic stirrer in nitrogen gas flow, and furthermore, reaction was made to occur while the solution was being agitated at 25° C. for one hour. Drying was performed by the same treatment as Example 1, and 353 mg of blue-green powder was obtained.

Using the perchlorate ion-type NiAl-LDH4 obtained, ion exchange with isethionate anions was performed. 80 mL of 0.067 mol/L methanol solution of sodium isethionate was prepared and added to 100 mg of $ClO_4$—NiAl-LDH4, and ion exchange reaction was made to occur at 25° C. for 20 hours. The supernatant was removed, the same amount of methanol solution of sodium isethionate was added, and once again, ion exchange was made to occur under the same conditions. Then the solution was filtered using a 0.2 μm membrane filter in nitrogen gas flow, and deposits were washed with methanol. The filtered out deposits were dried immediately in vacuum for one hour or longer, and 98 mg of blue-green powder was obtained. The Ni/Al molar ratio of the obtained Ise-Ni/Al-LDH4 was 3.93 (±0.08), which was nearly identical to that of the starting material.

Figure 23:
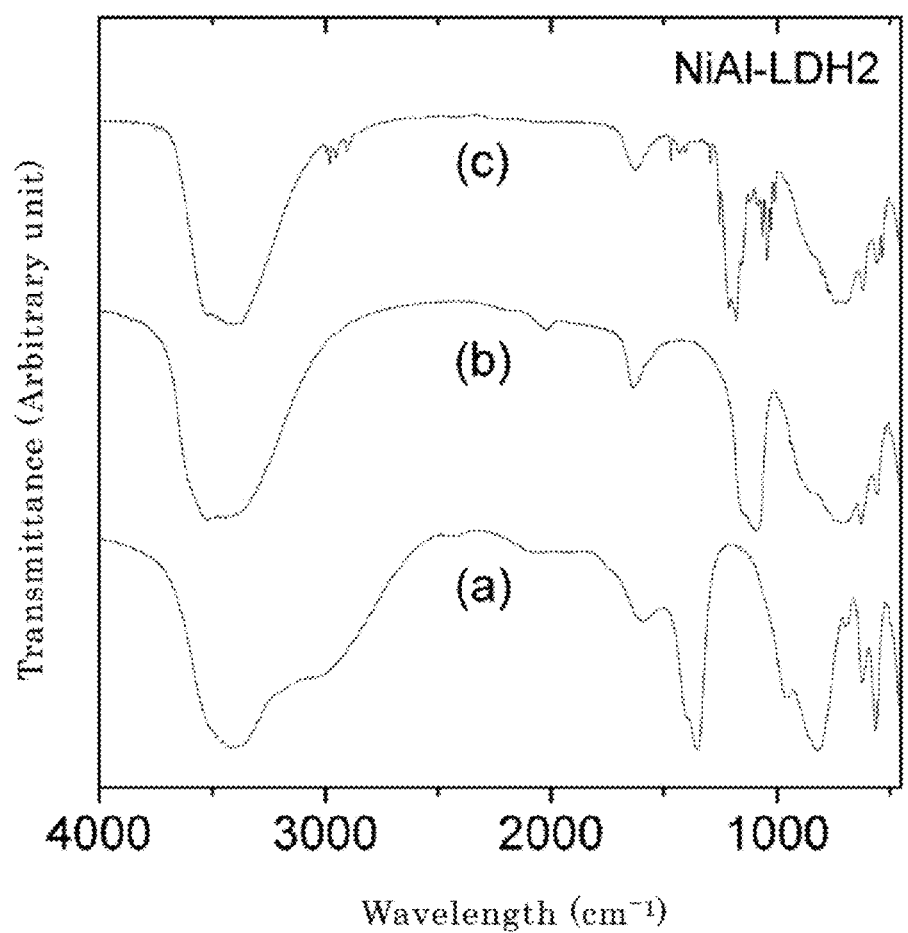
FIG. 23 is a chart showing the Fourier transform infrared spectrum (transmittance) of NiAl-LDH2in Example 5, wherein (a), (b), and (c) respectively represent that of NiAl-LDH2 including carbonate ions, perchlorate ions, and isethionate anions (Ise) between layers.
Figure 24:
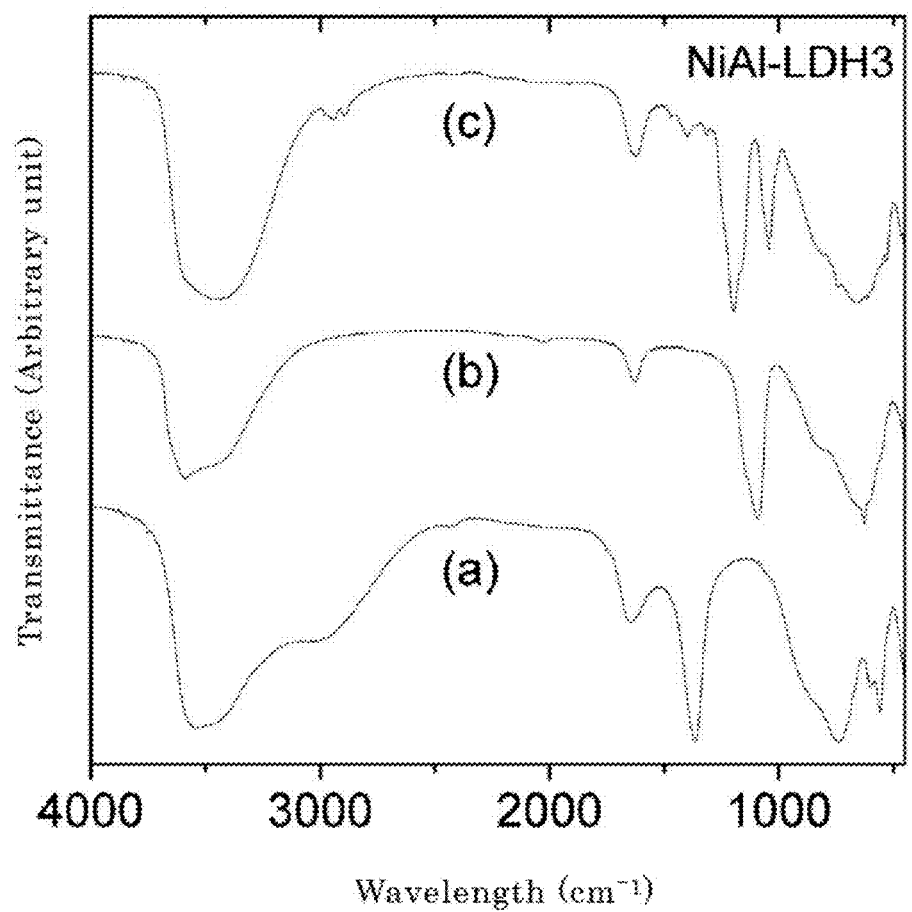
FIG. 24 is a chart showing the Fourier transform infrared spectrmn (transmittance) of NiAl-LDH3in Example 5, wherein (a), (b), and (c) respectively represent that of NiAl-LDH3 including carbonate ions, perchlorate ions, and isethionate anions (Ise) between layers.
Figure 25:
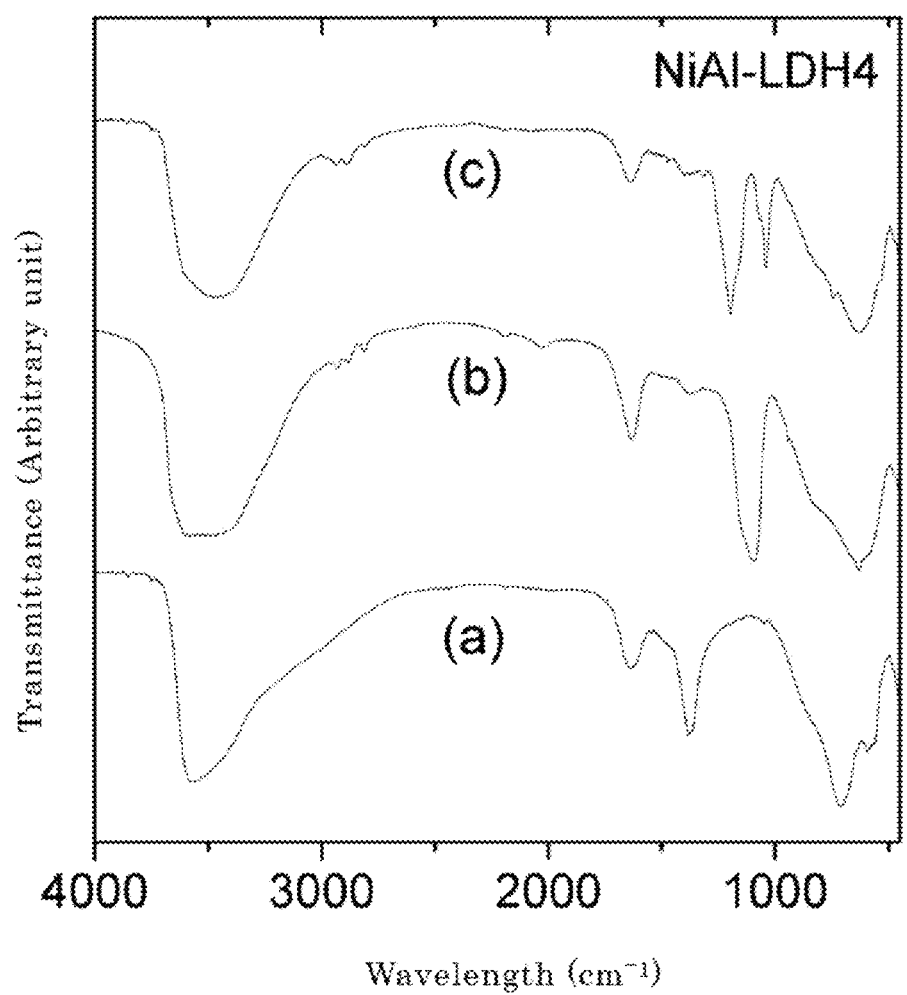
FIG. 25 is Fourier transform infrared spectrum (transmittance) of NiAl-LDH4 in Example 5, wherein (a), (b), and (c) respectively represent that of NiAl-LDH4 including carbonate ions, perchlorate ions, and isethionate ions between layers.

The infrared absorption profiles of NiAl-LDH2, NiAl-LDH3, and NiAl-LDH4 obtained by FTIR are respectively shown in FIGS. 23, 24, and 25. (a) in the FIGS. is the profile of carbonate ion-type LDH, (b) is that of perchlorate ion-type LDH, and (c) is that of Ise-type LDH.

All of the obtained Ise-NiAl-LDH2, Ise-NiAl-LDH3, and Ise-NiAl-LDH4 exhibited characteristic absorption specific to organic $SO_3^-$ at 1040 $cm^{-1}$ and 1200 $cm^{-1}$, and absorption by carbonate ions at 1360 $cm^{-1}$ and absorption of $ClO_4^-$ at 1100 $cm^{-1}$ were rarely seen, which indicates that high-purity Ise-type LDH has been produced.

NiAl-LDH2, NiAl-LDH3, and NiAl-LDH4 powder was retained in nitrogen atmosphere of RH of 0% for 15 minutes, and then X-ray diffraction measurement was performed.

Figure 26:
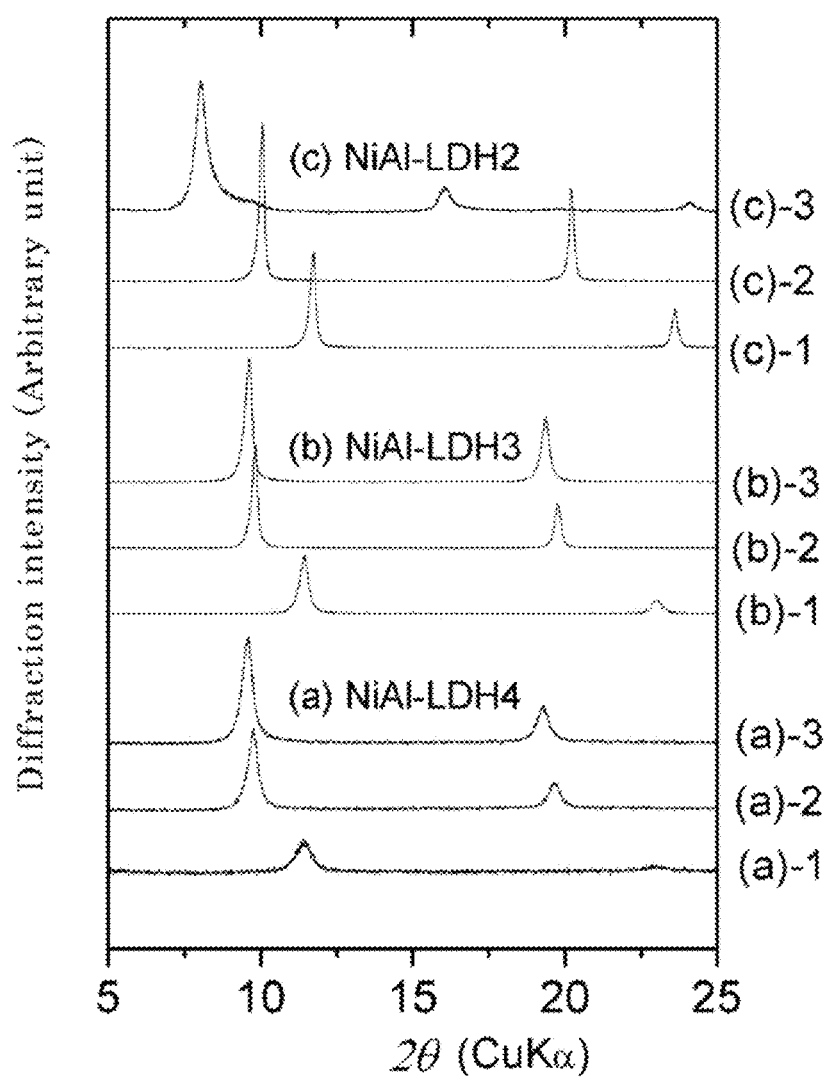
FIG. 26 is X-ray diffraction profile of NiAl-LDH in Example 5, wherein (a), (b), and (c) respectively represent that of NiAl-LDH4, NiAl-LDH3, and NiAl-LDH2.

FIG. 26 shows the results. In the FIG., (a) represents the profile of NiAl-LDH4, (b) represents that of NiAl-LDH3, (c) represents that of NiAl-LDH2, and the numbers 1, 2, and 3 suffixed to (a) to (c) respectively represent $CO_3^{2-}$ type, $ClO_4^-$ type, and Ise type.

Although Ise-NiAl-LDH2 exhibited slight broad reflection probably due to remaining $ClO_4^-$, conversion into Ise type by anion exchange is confirmed to have been performed completely. Table 2 lists the basal spacing of NiAl-LDH measured in nitrogen atmosphere.

TABLE 2

| | Basal spacing of NiAl-LDH | | |
| --- | --- | --- | --- |
| | | Anion | |
| LDH | $CO_3^{2-}$ | $ClO_4^-$ | Ise |
| NiAl-LDH2 | 0.753 | 0.878 | 1.096 |
| NiAl-LDH3 | 0.772 | 0.898 | 0.917 |
| NiAl-LDH4 | 0.774 | 0.904 | 0.921 |

The shapes of $CO_3^{2-}$-type, $ClO_4^-$-type, and Ise-type NiAl-LDHs were observed under a scanning electron microscope. In all of NiAl-LDH2, NiAl-LDH3, and NiAl-LDH4, the Ise type respectively succeeded the shape of carbonate ion-type LDH and that of perchlorate ion-type LDH, which indicates that conversion was performed by ion exchange while the original outer shape was maintained.

Figure 27:
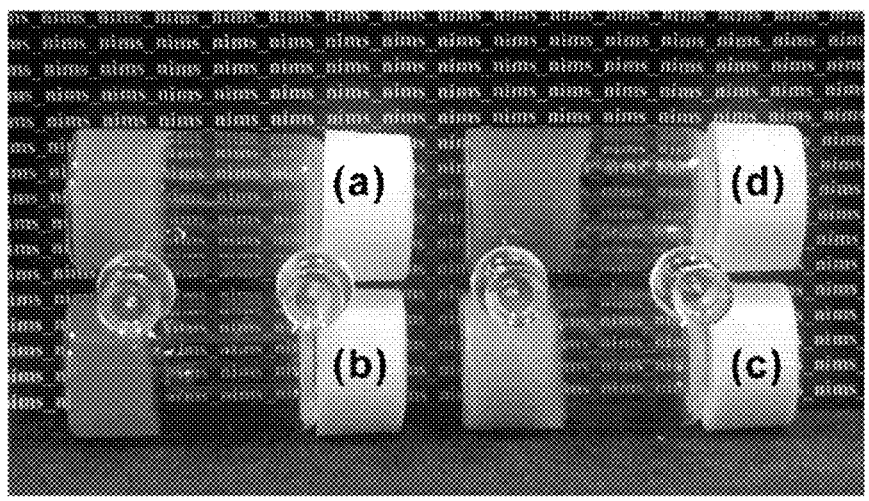
FIG. 27 is an image showing the state of LDH gel in Examples 5 and 6, wherein (a), (b), (c), and (d) respectively represent that of Ise-NiAl-LDH4, Ise-NiAl-LDH3, Ise-NiAl-LDH2, and Ise-CoAl-LDH2.

To 200 mg of each Ise-NiAl-LDH, water of the amount 8 to 10 times that of the LDHs was added, and generated state of gel is shown in FIG. 27. In the FIG., (a), (b), and (c) respectively show the state of gel produced by using Ise-NiAl-LDH4, Ise-NiAl-LDH3, and Ise-NiAl-LDH2. It is apparent that they are in semi-transparent jellied (gel) state so high in viscosity that they do not flow even if the bottles are placed on their sides.

Various NiAl-LDHs having various Ni/Al ratios were also confirmed to turn into water-swelling LDHs by introducing isethionate anions (Ise) between layers.

Example 6

(CoAl-LDH)

25 mL of mixed solution prepared by dissolving 238 mg of $CoCl_2.6H_2O$, 121 mg of $AlC_3.6H_2O$, and 300 mg of urea was poured into a 50-mL pressure-tight Teflon container, which was housed in a pressure-tight stainless container and sealed, and hydrothermal treatment was performed at 110° C. for one day. 145 mg of pink product was obtained. The Co/Al molar ratio was found by ICP analysis to be 1.91 (±0.06). This LDH is designated as $CO_3^{2-}$-CoAl-LDH2.

$CO_3^{2-}$-CoAl-LDH2 was converted into Cl$^-$-type CoAl-LDH2. To 104 mg of $CO_3^{2-}$-CoAl-LDH2, 50 mL of mixed solution of acetic acid buffer solution and NaCl was added, with the NaCl concentration adjusted to 2 mol using 0.1 mol/L acetic acid buffer solution having acetic acid ratio of 0.15, and reaction was made to occur while the solution was agitated using a magnetic stirrer in nitrogen gas flow (500 mL/min.) at 20° C. for 2 hours. Then the solution was filtered in nitrogen gas flow, using a 0.2 μm membrane filter, and the deposits were washed thoroughly using degassed water. The filtered out deposits were recovered, the pressure was immediately decreased, the deposits were dried in vacuum for one hour or longer, and 99 mg of pink powder was obtained.

To 100 mg of Cl$^-$-type CoAl-LDH2, 80 mL of 0.067 mol/L methanol solution of sodium isethionate was added, and ion exchange was made to occur at 25° C. for 20 hours. The supernatant was removed, the same amount of methanol solution of sodium isethionate was added, and ion exchange was made to occur again under the same conditions. Then the solution was filtered in nitrogen gas flow using a 0.2 μm membrane filter, and the deposits were washed with methanol. The filtered out deposits were recovered, the pressure was decreased immediately, the deposits were dried in vacuum for one hour or longer, and 121 mg of pink Ise-CoAl-LDH2 powder was obtained. The Co/Al molar ratio was found by ICP analysis to be 1.99 (±0.06).

Figure 28:
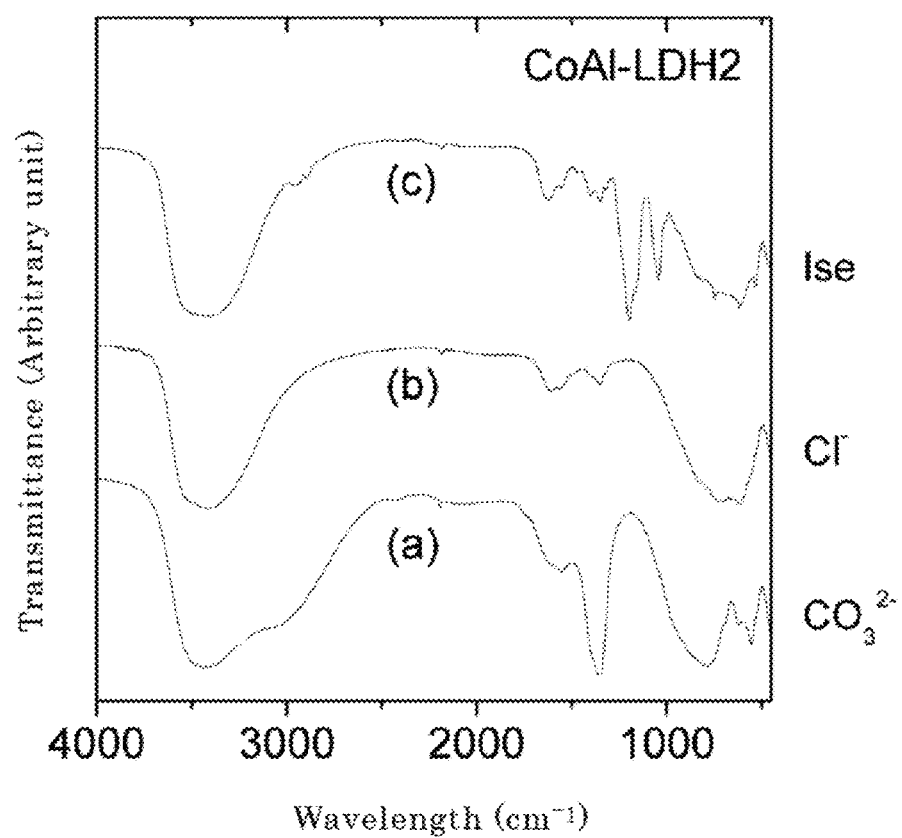
FIG. 28 is a chart showing the Fourier transform infrared spectrum of CoAl-LDH2 in Example 6, Wherein (a), (b), and (c) respectively represent that of CoAl-LDH2 including carbonate ions, chlorine ions, and isethionate anions (Ise).

FIG. 28 shows infrared absorption spectra of $CO_3^{2-}$-type CoAl-LDH2, Cl$^-$-type CoAl-LDH2, and Ise-CoAl-LDH2. In the FIG., (a), (b), and (c) respectively represent the spectrum of CoAl-LDH2 containing carbonate ions, chlorine ions, and isethionate anions (Ise) between layers.

Ise-CoAl-LDH2 (FIG. 28 (c)) exhibited intense absorption specific to organic sulfonate anions at 1040 and 1200 cm$^{-1}$, which confirms that Ise has been introduced between layers. However, conversion from $CO_3^{2-}$ into Cl$^-$ was not performed thoroughly, and consequently as shown in the infrared absorption profile in Cl$^-$-type LDH (FIG. 28 (b)), residual $CO_3^{2-}$ of approximately 10% was confirmed.

Figure 29:
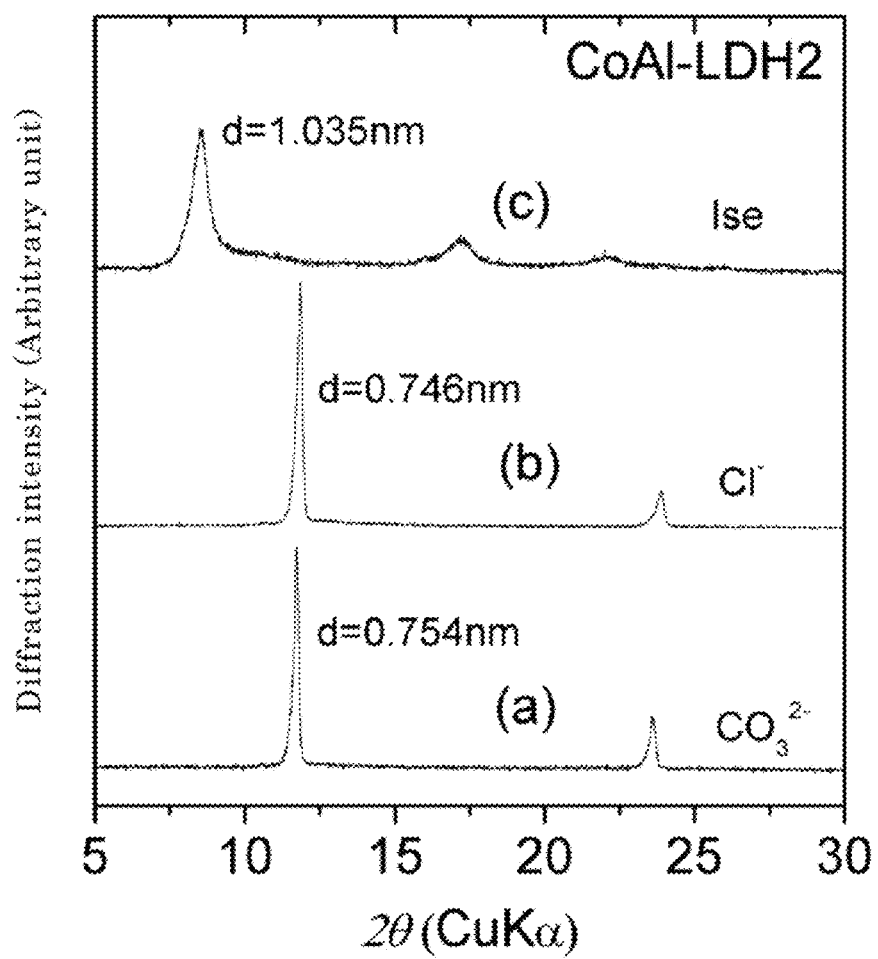
FIG. 29 is a chart showing the powder X-ray diffraction profile of CoAl-LDH2 in Example 6, wherein (a), (b), and (c) respectively represent that of CoAl-LDH2 including carbonate ions, chlorine ions, and isethionate anions (Ise) between layers.

FIG. 29 shows the result of powder X-ray diffraction measurement (performed at RH=0%). The basal spacing of Ise-CoAl-LDH2 was 1.035 nm. The profile exhibited reflection probably due to remaining $CO_3^{2-}$.

The water-swelling property of the obtained water-swelling LDH was examined.

To 200 mg of Ise-CoAl-LDH2, water of the amount 8 to 10 times that of the Ise-CoAlLDH2 was added, and gel was formed immediately. FIG. 27 (d) shows the gel generated. It is apparent that the gel is in a state of semi-transparent jelly. It is also apparent that even if $CO_3^{2-}$ remains by approximately 10%, water-swelling property does not degrade significantly.

From the above, Ise-CoAl-LDH2 was confirmed to have water-swelling property, and form high-viscosity gel and high-transparency colloidal solution in water.

The above Examples demonstrated that when combinations of divalent metal and trivalent metal were Mg—Al, Ni—Al, and Co—Al, water-swelling property appeared in divalent-trivalent metal ion LDHs. Consequently, it was found that the water-swelling property of LDHs is not affected by the type of constituent metal ions. In addition, swelling and delamination also occurred little affected by the type of constituent metal ions. As can be assumed easily, the same would apply to LDHs having metal combinations other than those shown in Examples.

Example 7

(Other Methods of Producing Ise-LDHs)

In Examples 1, 2, 5, and 6, conversion reaction from $CO_3^{2-}$-type LDH into $ClO_4^-$-type or Cl$^-$-type LDH, and further into Ise-LDH based on anion exchange of these was described.

Since this conversion is two-stage reaction when $CO_3^{2-}$-type LDH is used as starting material, more simple one-stage conversion reaction, namely direct conversion from $CO_3^{2-}$-type LDH to Ise-LDH, was attempted.

Using commercially available hydrotalcite represented by general formula $Mg_3Al(OH)_8(CO_3^{2-})_{0.5} \cdot 2H_2O$ used in Example 1, and using ammonium isethionate as an acidic material, reaction was made to occur in alcohol. This reaction is represented by formula (2) with $X^{n-}$ substituted by $CO_3^{2-}$, and by formula (3) with $L^{n+}$ substituted by $NH_4^+$.

Since the amount of ammonium isethionate to be used is equivalent to twice the number of moles of $CO_3^{2-}$ in $CO_3^{2-}$-type LDH, this amount (designated as $[HOC_2H_4SO_3NH_4]/(2 \times [CO_3^{2-}])$ was defined as f, and expressed as the value of f.

100 mg (0.331 mmol) of $CO_3^{2-}$MgAl-LDH3 was poured into a three-neck flask, to which 35 mL of methanol was added, and ultrasonically dispersed to obtain suspended liquid. To this suspended liquid, a solution obtained by dissolving ammonium isethionate (f=2) (Aldrich special class, purity: 99%) (95 mg; 0.662 mmol) in 15 mL methanol was added in nitrogen gas flow (0.5 L/min.) while the suspended liquid was being agitated with a magnetic stirrer. A water-cooling condenser was attached to the three-neck flask, and reaction was made to occur at 60° C. for 2 hours while $CO_3^{2-}$MgAl-LDH3 suspended liquid was being agitated with the magnetic stirrer in nitrogen gas flow and heated in water bath.

A large amount of $CO_2$ due to decarbonated ions was found in discharged nitrogen gas. After the reaction, the solution was filtered in nitrogen gas flow using a 0.2 µm membrane filter, and the deposits were washed thoroughly with methanol. The filtered out deposits were collected and recovered, the pressure was immediately decreased, the deposits were dried in vacuum for one hour or longer, and 121 mg of white powder was obtained. The yield ranged from 92 to 97%.

The FTIR and powder XRD profiles of the obtained material were identical to those of Ise-MgAl-LDH3 in Example 1, and no $CO_3^{2-}$ residue was found between layers. The obtained product immediately turned into gel by contact with water. From the above, generation of high-purity isethionate ion-type LDH was confirmed.

The above experiments were conducted at a temperature of 60° C. Experiments were also carried out at temperatures lower than 60° C. The results indicate that although isethionate ions enter between layers under lower temperature conditions, the lower the temperature, the higher the amount of residual $CO_3^{2-}$ between layers tended to be. For example, approximately 5% and 10% residual $CO_3^{2-}$ was respectively observed when the temperature was 55° C. and 50° C.

Experiments were carried out using ammonium isethionate of the amount exceeding f=2. For example, when f=8, no residual $CO_3^{2-}$ was found at 55° C., but increasing temperature was more effective than increasing the amount of ammonium isethionate (f) in decreasing the amount of residual $CO_3^{2-}$.

Experiments were conducted using ethanol, instead of methanol, as alcohol by the same method. In this case also, Ise-LDH was obtained when reaction temperature was 65° C. or higher and f=2 or higher, with no residual $CO_3^{2-}$ found.

For comparison, similar experiments were carried out using sodium isethionate that does not discharge protons. Although inclusion of isethionate ions of several % was confirmed by FTIR, carbonate ion-type LDH profiles were obtained basically, which indicates that the above single-stage reaction occurs effectively only when ammonium salt, which is an acidic compound, is used.

INDUSTRIAL APPLICABILITY

As described above, the water-swelling LDHs of the present invention satisfy all the following conditions: high crystallinity, high purity, high stability, general versatility, scentlessness, and non-toxicity, and swell in a solvent containing water, thus facilitating producing gel or colloidal solution containing LDH nanosheets.

The LDH nanosheets of the present invention are useful as cationic nanomaterials. In addition, since the LDH nanosheets of the present invention are in delaminated state, improvement in reactivity is expected, and organic/inorganic hybrids are expected to be formed with huge anions and molecules, which cannot be included by ordinary ion exchange.

Furthermore, application in and development into new fields, such as generation of highly elastic gel materials based on composition with water-soluble polymers and formation of nanostructures having catalyst/sensor functions, are expected.

What is claimed is:

1. A water-swelling layered double hydroxide represented by general formula (1) shown below and having isethionate anions ($HOC_2H_4SO_3^-$) between layers:

$$Q_zR(OH)_{2(z+1)}(A^-)_{(1-y)}(X^{n-})_{y/n} \cdot mH_2O \quad (1)$$

where Q represents divalent metal, R represents trivalent metal, $A^-$ represents an isethionate anion ($HOC_2H_4SO_3^-$), m represents a real number larger than 0, z falls within a range $1.8 \leq z \leq 4.2$, $X^{n-}$ represents an anion of a valence of n remaining without being substituted by $A^-$, where n is 1 or 2, y represents the remaining content of $X^{n-}$, where y falls within a range or $0 \leq y < 0.4$.

2. The water-swelling layered double hydroxide as set forth in claim 1, where Q is one or more types of metals selected from a group of divalent metals of Mg, Mn, Fe, Co, Ni, Cu, Zn, and Ca.

3. The water-swelling layered double hydroxide as set forth in claim 1, where R is one or more types of metals selected from a group of trivalent metals of Al, Ga, Cr, Mn, Fe, Co, Ni, and La.

4. The water-swelling layered double hydroxide as set forth in claim 1, where $X^{n-}$ is $Cl^-$, $Br^-$, $NO_3^-$, $ClO_4^-$, or $ClO_3^-$ when n=1, and $CO_3^{2-}$ when n=2.

5. A method for producing a water-swelling layered double hydroxide as set forth in claim 1, comprising:
dispersing a layered double hydroxide having a composition represented by general formula (2) shown below in a solution obtained by dissolving a compound containing organic sulfonate anion ($A^-$) and represented by general formula (3) shown below in water or in an organic solvent, and
allowing anion exchange between $X^{n-}$ and $A^-$ to occur, and washing product with organic solvent:

$$Q_zR(OH)_{2(z+1)}(X^{n-})_{1/n} \cdot mH_2O \quad (2)$$

where z represents a numeric value range $1.8 \leq z \leq 4.2$, Q represents a divalent metal ion, R represents a trivalent metal ion, m represents a real number larger than 0, and $X^{n-}$ represents an anion of valence of n, $$[L^{n+}]_{1/n}[A^-] \quad (3)$$

where $L^{n+}$ represents a positive ion of valence of n, n falls within a numeric value range of $1 \leq n \leq 3$, $L^{n+}$ is $Na^+$, $NH_4^+$, $Li^+$, $K^+$, or $H^+$ when n=1, and $Mg^{2+}$, $Ca^{2+}$, $Sr^{2+}$, or $Ca^{2+}$ when n=2, and $Al^{3+}$ when n=3, and the organic sulfonate anion ($A^-$) is isethionate anion ($HOC_2H_4SO_3^-$).

6. The method for producing the water-swelling layered double hydroxide as set forth in claim 5, wherein the $X^{n-}$ is $ClO_4^{31}$, and the organic solvent is methanol.

7. A gel or sol substance obtained by swelling the water-swelling layered double hydroxide as set forth in claim 1 in water or in a mixed solvent consisting of water at 50 mol % or higher, the rest being water-soluble organic solvent.

8. A double hydroxide nanosheet obtained by delaminating the water-swelling layered double hydroxide as set forth in claim 1 in water or in a mixed solvent consisting of water at 50 mol % or higher, the rest being water-soluble organic solvent, and represented by general formula (4) shown below:

$$[Q_zR(OH)_{2(z+1)}]^+ \quad (4)$$

where Q represents divalent metal, R represents trivalent metal, and z falls within a numeric value range $1.8 \leq z \leq 4.2$.

9. The double hydroxide nanosheet as set forth in claim 8, where the thickness is 0.5 nm or thicker but not exceeding 10 nm.

10. The method for producing the double hydroxide nanosheet as set forth in claim 9, characterized in that the water-swelling layered double hydroxide is delaminated in water or in a mixed solvent consisting of water at 50 mol % or higher, the rest being water-soluble organic solvent.

11. The method for producing the double hydroxide nanosheet as set forth in claim 8, characterized in that the water-swelling layered double hydroxide is delaminated in water or in a mixed solvent consisting of water at 50 mol % or higher, the rest being water-soluble organic solvent.

* * * * *